US012311208B2

(12) United States Patent
Macaraeg et al.

(10) Patent No.: US 12,311,208 B2
(45) Date of Patent: May 27, 2025

(54) ADAPTIVE CABIN FIREFIGHTING METHODOLOGY

(71) Applicant: The Boeing Company, Chicago, IL (US)

(72) Inventors: Sesinando Prado Macaraeg, Everett, WA (US); Brandon Wayne Freyling, Mukileo, WA (US)

(73) Assignee: THE BOEING COMPANY, Arlington, VA (US)

( * ) Notice: Subject to any disclaimer, the term of this patent is extended or adjusted under 35 U.S.C. 154(b) by 688 days.

(21) Appl. No.: 17/361,453

(22) Filed: Jun. 29, 2021

(65) Prior Publication Data

US 2022/0016458 A1 Jan. 20, 2022

Related U.S. Application Data

(60) Provisional application No. 63/053,114, filed on Jul. 17, 2020.

(51) Int. Cl.
*A62C 3/08* (2006.01)
*A62C 35/68* (2006.01)

(52) U.S. Cl.
CPC ................ *A62C 3/08* (2013.01); *A62C 35/68* (2013.01)

(58) Field of Classification Search
CPC .. A62C 3/07; A62C 3/08; A62C 35/58; A62C 35/64; A62C 35/645; A62C 35/66; A62C 35/68
USPC ...... 239/443, 444, 447, 526; 169/62, 16, 46, 169/47
See application file for complete search history.

(56) References Cited

U.S. PATENT DOCUMENTS 3,134,545 A * 5/1964 Armond .................. E03C 1/046 239/443
3,977,603 A * 8/1976 Magee, Jr. ............ B05B 9/0423 239/332
3,986,523 A * 10/1976 Pacht ........................ B05B 1/30 239/443

FOREIGN PATENT DOCUMENTS

EP 0083485 A1 7/1983
EP 1283065 A2 2/2003
WO 9107208 A2 5/1991

* cited by examiner

*Primary Examiner* — Christopher S Kim
(74) *Attorney, Agent, or Firm* — COATS & BENNETT, PLLC

(57) ABSTRACT

Methods, systems and apparatuses are disclosed for fire suppression systems in passenger vehicle cabins incorporating the use of an existing water supply and optionally existing water delivery system plumbing, or providing dedicated high-pressure water delivery plumbing to an existing water delivery system, with existing water delivery system comprising existing water delivery stations altered to comprise fixtures to facilitate the dispensing of water from the existing water delivery stations at elevated pressures, on demand.

16 Claims, 20 Drawing Sheets

ADAPTIVE CABIN FIREFIGHTING METHODOLOGY

RELATED APPLICATION

This U.S. Non-Provisional Application claims priority from U.S. Provisional Application Ser. No. 63/053,114 filed Jul. 17, 2020, the entire content of which is incorporated by reference herein, as if made a part of the present Application.

TECHNOLOGICAL FIELD

The present disclosure relates generally to the field of fire suppression. More specifically the present disclosure relates to the field of battery and/or chemical fire suppression systems and methods aboard vehicles including aircraft.

BACKGROUND

The use of lithium-ion batteries as power sources for portable electronics, including personal electronic devices (e.g., laptop computers, tablets, phones, etc.) continues to increase. Electronic device malfunction due to lithium-ion battery malfunction has resulted in fires, sometimes due to the over-heating of the lithium-ion batteries used to power portable electronic devices.

While the outbreak of a fire in any setting is cause for concern, the occurrence of a fire in a vehicle passenger cabin is of particular concern. Fire control systems aboard vehicles, including, for example, passenger aircraft exist are required and regulated. For example, current FAA regulations call for the use of non-flammable liquids to combat and neutralize battery-generated heat in the case of a battery fire (typically classified as chemical fires). Applying large amounts of water to prevent battery fire re-ignition is most desirable, but the additional weight realized by equipping passenger aircraft with auxiliary extinguishers and auxiliary fire suppression systems can significantly impact an aircraft's overall weight, thus impacting the operational efficiency, cost, and other factors in the aviation field.

SUMMARY

According to present aspects, a system is disclosed for extinguishing a cabin fire in a vehicle cabin, such as an aircraft cabin, with the system including at least one water supply, with the at least one water supply in communication with a water supply first line. Further, the system includes a water delivery station, with the water delivery station in communication with the water supply first line, and with the water delivery station including a first water delivery outlet in communication with the water supply first line, with the first water delivery outlet configured to deliver a first water flow from the first water delivery outlet at a first water flow pressure. The water delivery station further includes a second water delivery outlet in communication with the water supply first line, with the second water delivery outlet configured to deliver a second water flow from the second water delivery outlet at a second water flow pressure, wherein the second water flow pressure exceeds the first water flow pressure.

In another aspect, the first water flow pressure equals a pressure ranging from about 10 to about 40 psig.

In another aspect, the first water flow pressure equals a pressure ranging from about 30 to about 40 psig.

In another aspect, the second water flow pressure equals a pressure ranging from about 100 to about 150 psig.

In another aspect, the system further includes a dispenser, with the dispenser configured to mate with the second water delivery outlet.

In another aspect, the at least one of the second water delivery outlet and the dispenser comprise a pressure-increasing device.

In another aspect, the system further includes at least one pressure-increasing device in communication with the water supply first line.

In another aspect, the system further includes at least one pressure-increasing device in communication with the water supply first line, wherein the at least one pressure-increasing device includes at least one pump.

In another aspect, the system further includes a plurality of water delivery stations, with the plurality of water delivery stations in communication with the water supply first line.

In another aspect, the system further comprises a water supply second line, with the water supply second line in communication with at least one water supply, and with the water supply second line further in communication with the second water delivery outlet.

In another aspect, at least one water supply is contained within an existing vehicle water tank.

In another aspect, the pressure-increasing device comprises a venturi valve.

In a further aspect, the pressure-increasing device is in communication with an air source.

In another aspect, the system further includes at least one pump in communication with the water supply second line.

According to further aspects, a vehicle is disclosed, with the vehicle including a fire suppression system for delivering water, with the system including at least one water supply, with the at least one water supply in communication with a water supply first line. The system further includes at least one pressure increasing device (e.g., a pump, etc.) in communication with the at least one water supply and the water supply first line. Further, the system includes a water delivery station, with the water delivery station in communication with the water supply first line, and with the water delivery station including a first water delivery outlet in communication with the water supply line, with the first water delivery outlet configured to dispense a first water flow at a first water flow pressure ranging from about 10 to about 40 psig. The water delivery station further includes a second water delivery outlet in communication with the water supply first line, with the second water delivery outlet configured to dispense a second water flow at a second water flow pressure ranging from about 100 to about 150 psig. The system further includes a dispenser configured to mate with the second water delivery outlet, and wherein the dispenser is configured to dispense water from the water supply to a target zone in a vehicle cabin.

In another aspect, the vehicle includes at least one of an aircraft, a rotorcraft; a terrestrial vehicle, and a waterborne vehicle.

In another aspect, the water supply is an existing vehicle water supply.

In a further aspect, the system further comprises a water supply second line in communication with the at least one water supply, with the water supply second line further in communication with the water delivery station, with the water supply second line further in communication with the second water delivery outlet.

According to another aspect, a method is disclosed, with the method including installing a water delivery station into a vehicle, with the water delivery station including a first water delivery outlet, with the first water delivery outlet in communication with at least one of a water supply first line and a water supply second line. The method further includes engaging the water delivery station in communication with at least one of a water supply first line and a water supply second line. The water delivery station further includes a second water delivery outlet, with the second water delivery outlet configured to mate with a dispenser, and with the second water delivery outlet in communication with at least one of a water supply first line and a water supply second line, and wherein the first water delivery outlet is configured to deliver a first water flow from the water delivery station at a first water flow pressure value, and the second water delivery outlet is configured to deliver a second water flow from the water delivery station at a second water flow pressure value, with the second water flow pressure value greater than the first water flow pressure value.

In another aspect, the first water flow pressure value ranges from about 10 to about 40 psig, and the second water flow pressure ranges from about 100 to about 150 psig.

In another aspect, the first water flow pressure value ranges from about 30 psig to about 40 psig.

In a further aspect, the dispenser is removable from the second water delivery outlet.

According to another aspect, a method for suppressing a fire in a vehicle cabin is disclosed, with the method including directing water from a vehicle water supply to a water delivery station, with the water delivery station including a first water delivery outlet configured to deliver a first water flow from the first water delivery outlet at a first water flow pressure, and with the first water delivery outlet in communication with the vehicle water supply, and a second water delivery outlet configured to deliver a second water flow from the second water delivery outlet at a second water flow pressure, with the second water delivery outlet in communication with the vehicle water supply, and with the second water delivery outlet configured to mate with a dispenser. The method further includes connecting the dispenser to the second water delivery outlet, releasing the second water flow from the dispenser, and wherein the second water flow pressure is greater than the first water flow pressure.

In another aspect, before the step of releasing the second water flow, the method further includes directing an amount of water from the vehicle water supply to the second water delivery outlet.

In another aspect, the first water flow pressure ranges from about 10 to about 40 psig, and the second water flow pressure ranges from about 100 to about 150 psig.

In a further aspect, the dispenser includes a nozzle assembly, with the nozzle assembly further including a hose.

In a further aspect, the vehicle water supply is located proximate to the water delivery station.

In another aspect, the vehicle water supply delivered to the second water delivery outlet includes an auxiliary water supply located proximate to the water delivery station.

In another aspect, a system for extinguishing a cabin fire in a vehicle cabin is disclosed, with the system including an auxiliary water supply, with the auxiliary water supply in communication with an auxiliary supply line. Further, the system includes a water delivery station, with the water delivery station in communication with the auxiliary water supply line, and with the water delivery station including a first water delivery outlet configured to deliver a first water flow from the first water delivery outlet at a first water flow pressure. The water delivery station further includes a second water delivery outlet, with the second water delivery outlet configured to deliver a second water flow at a second water flow pressure, wherein the second water flow pressure is greater than the first water flow pressure.

In another aspect, the system includes a main water supply in communication with the first water delivery outlet.

In a further aspect, the first water delivery outlet and the second water delivery outlet are in communication with the auxiliary water supply line.

In a further aspect, the first water delivery outlet is in communication with a main water supply line, and the second water delivery outlet is in communication with the auxiliary water supply line In a further aspect, the auxiliary water supply is located remotely from the water delivery station.

In another aspect, the water delivery station includes the auxiliary water supply.

In another aspect, the system further includes a removeable dispenser, with the removeable dispenser configured to mate with the second water delivery outlet.

In another aspect, the system further includes a pressure-increasing device, said pressure-increasing device in communication with the auxiliary water supply.

In another aspect, the water delivery station further includes a pressure-increasing device, said pressure-increasing device in communication with the auxiliary water supply.

In another aspect, the pressure-increasing device includes at least one of a pump, a venturi valve, and an air source.

In a further aspect, the system includes a plurality of water delivery stations.

In another aspect, the auxiliary water supply is in communication with a plurality of water delivery stations.

In another aspect, the water delivery station includes at least one of a galley water delivery station and a lavatory water delivery station.

In another aspect, a vehicle including a system for extinguishing a cabin fire in a vehicle cabin is disclosed, with the system including an auxiliary water supply, with the auxiliary water supply in communication with an auxiliary supply line. Further, the system includes a water delivery station, with the water delivery station including a first water delivery outlet configured to deliver a first water flow from the first water delivery outlet at a first water flow pressure. The water delivery station further includes a second water delivery outlet in communication with the auxiliary water supply, with the second water delivery outlet configured to dispense a second water flow at a second water flow pressure, wherein the second water flow pressure exceeds the first water flow pressure.

In a further aspect, the vehicle includes at least one of an aircraft, a rotorcraft; a terrestrial vehicle, and a waterborne vehicle.

According to another aspect, a system for extinguishing a fire in a vehicle cabin is disclosed, with the system including a water delivery station, with the water delivery station in communication with an auxiliary water supply, and with the water delivery station further in communication with a main water supply. The water delivery station includes a first water delivery outlet in communication with the main water supply, and with the first water delivery outlet configured to deliver a first water flow from the first water delivery outlet at a first water flow pressure. The water delivery station further includes a second water delivery outlet in communication with the auxiliary water supply, with the second water delivery outlet configured to deliver a second water flow from the second water delivery outlet at a second water flow pressure. The second water delivery outlet is configured to mate with a dispenser, and wherein the second water flow pressure is greater than the first water flow pressure.

According to another aspect, a method for suppressing a fire in a vehicle cabin is disclosed, with the method including accessing a water delivery station, with the water delivery station including an auxiliary water supply line, and with the water delivery station further including a first water delivery outlet configured to deliver a first water flow from the first water delivery outlet at a first water flow pressure. The water delivery station further includes a second water delivery outlet in communication with the auxiliary water supply line, with the second water delivery outlet configured to deliver a second water flow at a second water flow pressure, wherein the second water flow pressure is greater than the first water flow pressure. The method further includes engaging a dispenser (that can be a removable dispenser) with the second water delivery outlet and delivering a second water flow from the second water delivery station at the second water flow pressure.

In another aspect, after engaging the removable dispenser with the second water delivery system, the method further includes increasing a first water flow pressure value to a second water flow pressure value.

In another aspect, the first water flow pressure ranges from about 10 to about 40 psig. and the second water flow pressure ranges from about 100 to about 150 psig.

In a further aspect, the first water delivery outlet is in communication with a main water supply, and the second water delivery outlet is in communication with an auxiliary water supply.

In another aspect, at least one of the first water delivery outlet and the second water delivery outlet is in communication with an auxiliary water supply.

According to a further aspect, a system for extinguishing a fire in a vehicle cabin is disclosed, with the system including at least one of a first water supply and a second water supply, with the first water supply in communication with a water supply first line and the second water supply in communication with a water supply second line. The system further includes a water delivery station in communication with at least one of the water supply first line and the water supply second line. The water delivery station further includes a first water delivery outlet in communication with at least one of the water supply first line and the water supply second line, and a second water delivery outlet in communication with at least one of the water supply first line and the water supply second line, with the first water delivery outlet configured to deliver a first water flow at a first water flow pressure and with the second water delivery outlet in configured to deliver a second water flow at a second water flow pressure, with the second water flow pressure greater than the first water flow pressure. The system further includes a dispenser in communication with the second delivery outlet, with the dispenser configured to deliver a water-based fire retardant to a target zone in a vehicle cabin.

In another aspect, the dispenser includes at least one sprinkler.

In another aspect, the dispenser includes a reservoir.

In a further aspect, at least one of the dispenser and the reservoir is in communication with a fire-retardant precursor supply.

In another aspect, the reservoir is configured to receive at least one of the first water flow and the second water flow.

In a further aspect, the reservoir is configured to combine at least one of the first water flow and the second water flow with the fire-retardant precursor to form the water-based fire retardant.

In another aspect, the reservoir includes the fire-retardant precursor.

In another aspect, the fire-retardant precursor includes a foaming agent that can be a foaming agent concentrate.

In a further aspect, the dispenser includes a dispenser inlet, with the dispenser inlet configured to mate with the second water delivery outlet.

In another aspect, the dispenser is configured to engage with and disengage from the second water delivery outlet.

In a further aspect, at least one of the dispenser and the second water delivery outlet includes a sensor, with the sensor including or with the sensor in communication with a transmitter, with the transmitter configured to transmit a signal when the dispenser is engaged with the second water delivery outlet.

In another aspect, the system includes a pressure-increasing device, with the pressure-increasing device further including or in communication with a receiver, with the receiver configured to receive a signal from the transmitter.

According to another aspect, a method for suppressing a fire in a vehicle cabin is disclosed, with the method including directing water from at least one water supply to a water delivery station, with the delivery station including a first water delivery outlet in communication with at least one of the water supply first line and the water supply second line, and a second water delivery outlet in communication with at least one of the water supply first line and the water supply second line, with the first water delivery outlet configured to deliver a first water flow at a first water flow pressure and with the second water delivery outlet configured to deliver a second water flow at a second water flow pressure, with the second water flow pressure exceeding the first water flow pressure. The method further includes connecting a dispenser to the second water delivery outlet, with the dispenser in communication with a fire-retardant precursor, and releasing a water-based fire-retardant from the dispenser.

In another aspect, after placing the dispenser in communication with the second water delivery outlet, the method further includes directing a water flow to the second water delivery outlet, combining the water flow with a fire-retardant precursor, forming a water-based fire-retardant, and releasing the water-based fire retardant from the dispenser.

In another aspect, the water supply includes a main vehicle water supply, and the method further includes directing an amount of water from the main vehicle water supply to the second water delivery outlet.

In a further aspect, the water supply includes an auxiliary water supply, and the method further includes directing an amount of water from the auxiliary water supply to the second water delivery outlet.

In a further aspect, at least one of the dispenser and the second water delivery outlet includes a sensor, with the sensor including or with the sensor in communication with a transmitter, with the transmitter configured to transmit a signal when the dispenser is engaged with the second water delivery outlet, and after connecting the dispenser to the second delivery outlet, the method further including transmitting a signal from the sensor to a receiver located in or otherwise in communication with a pressure-increasing device, and increasing pressure in the water supply line to a pressure ranging from about 100 to about 150 psig.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
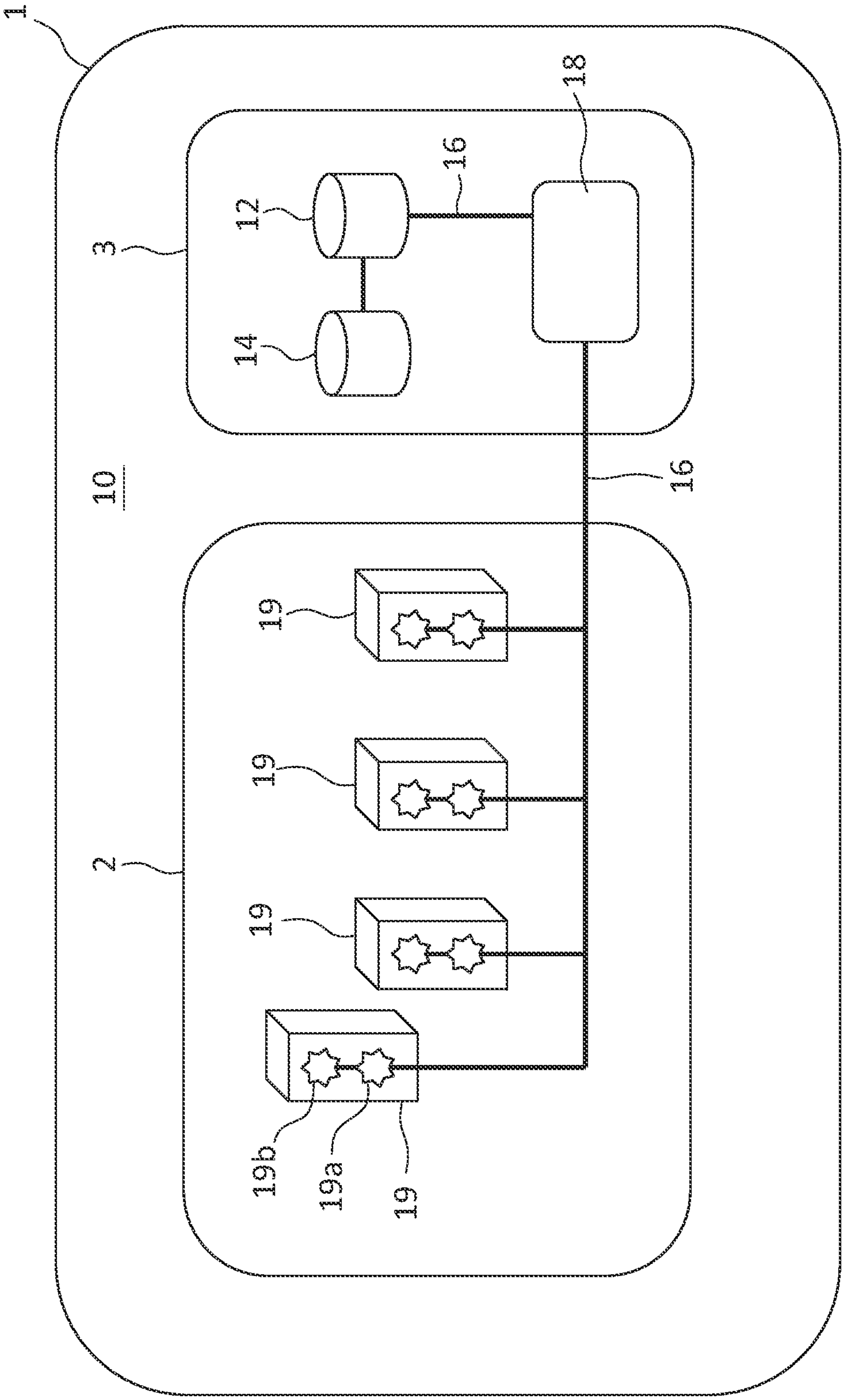
Figure 2:
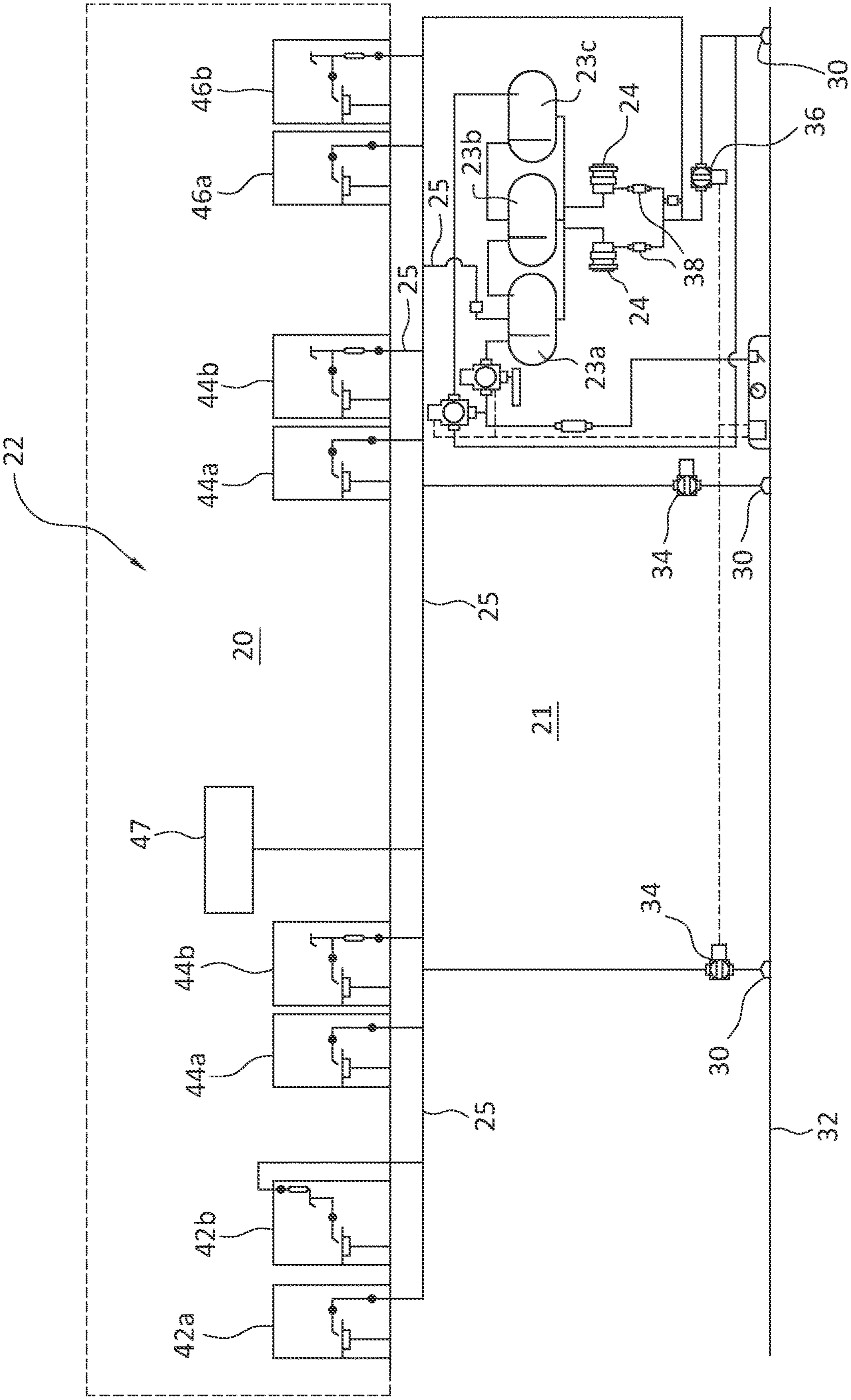
Figure 3:
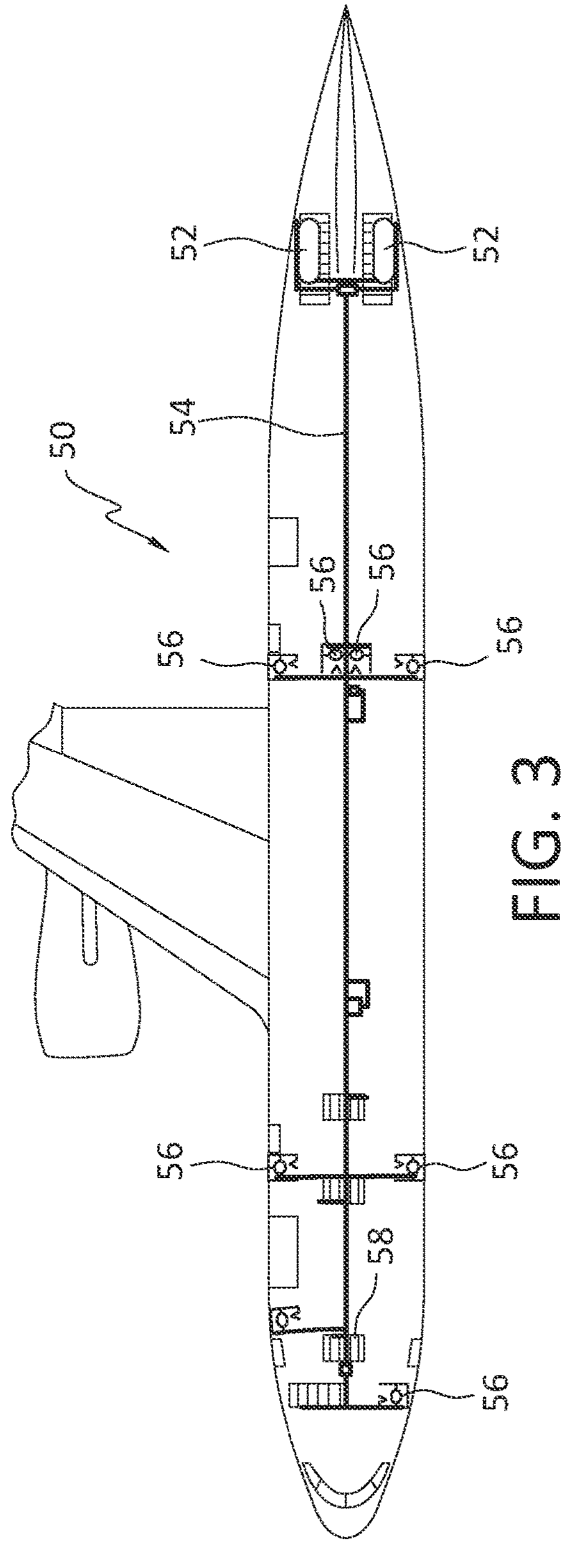
Figure 4:
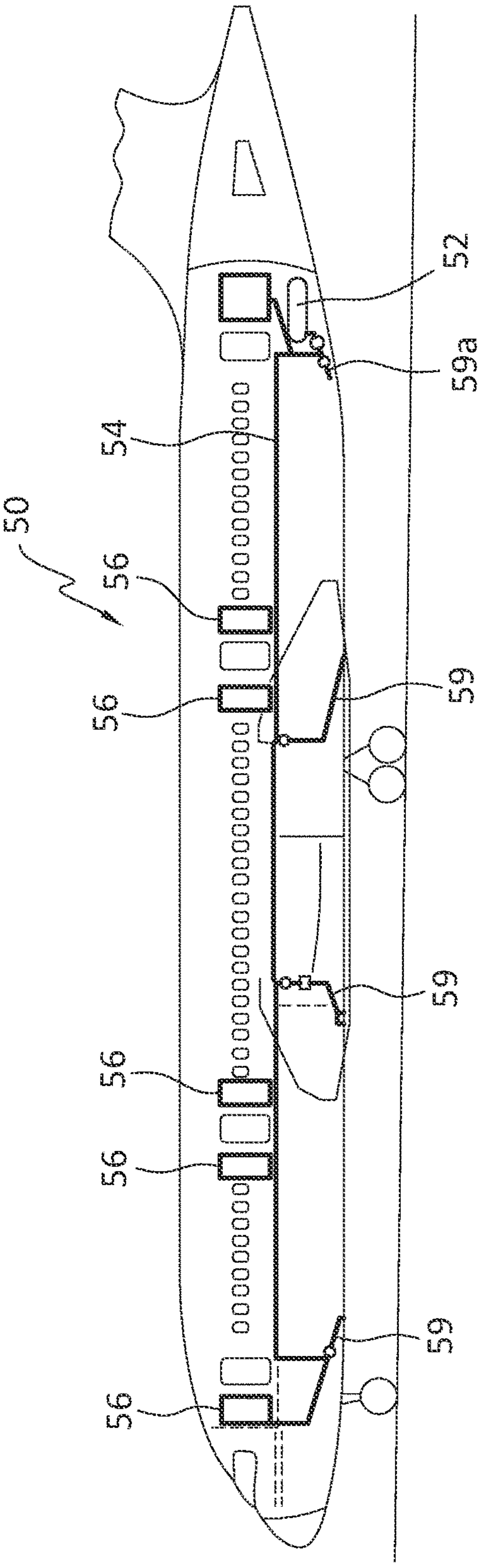
Figure 5:
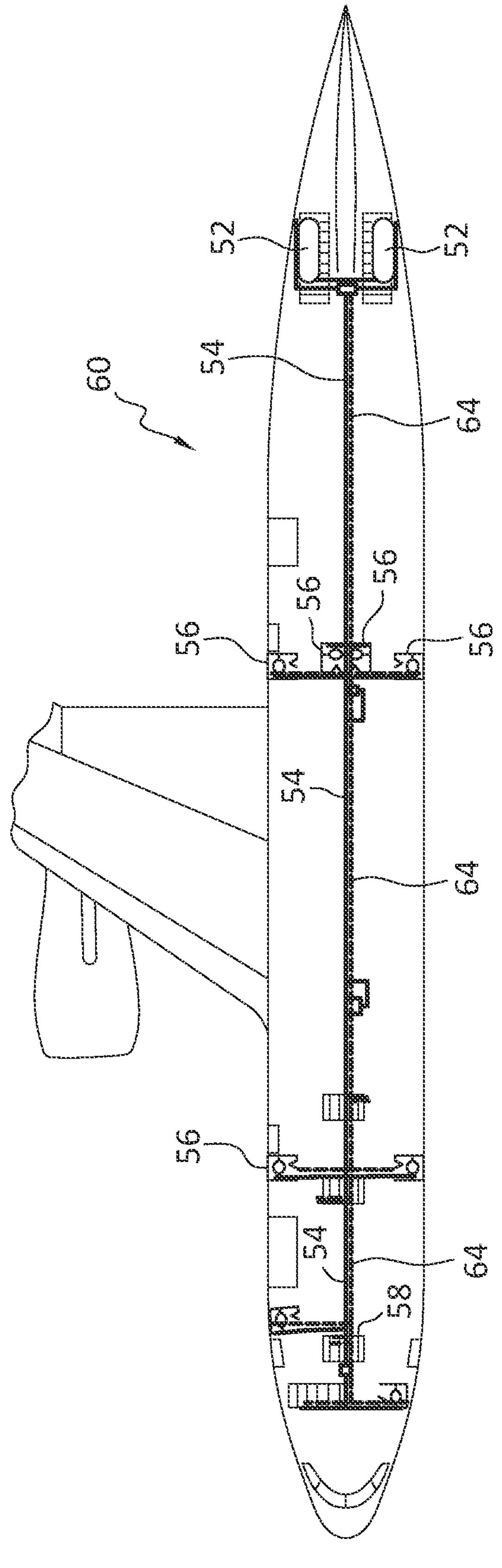
Figure 6:
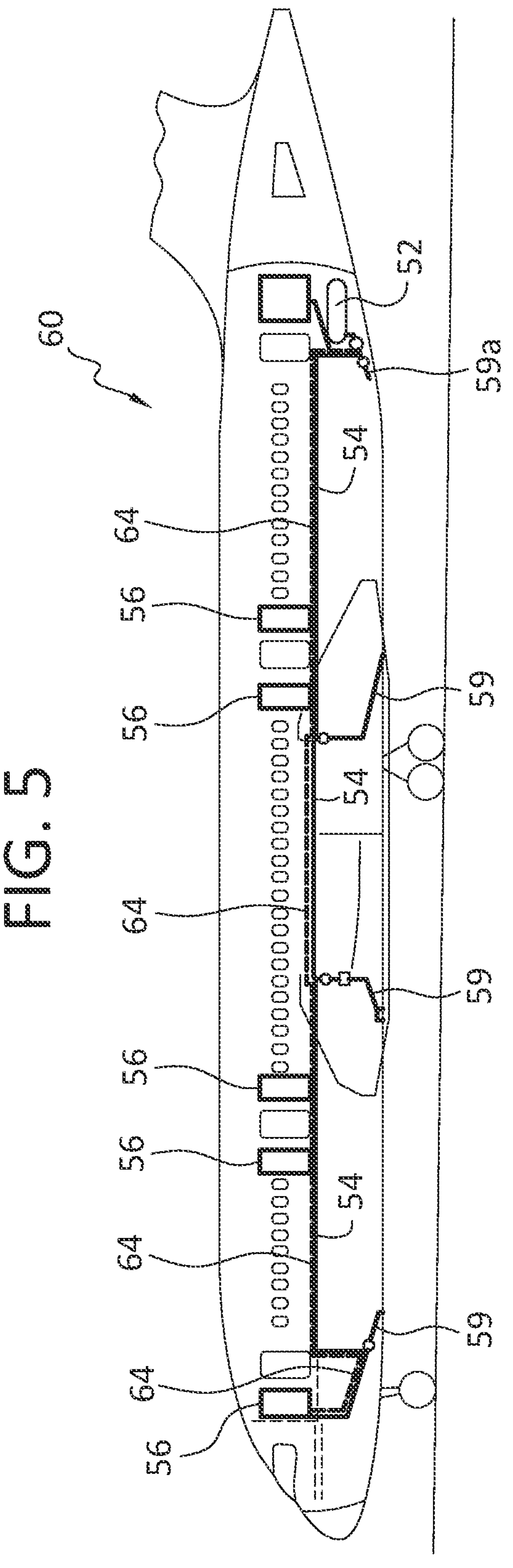
Figure 7:
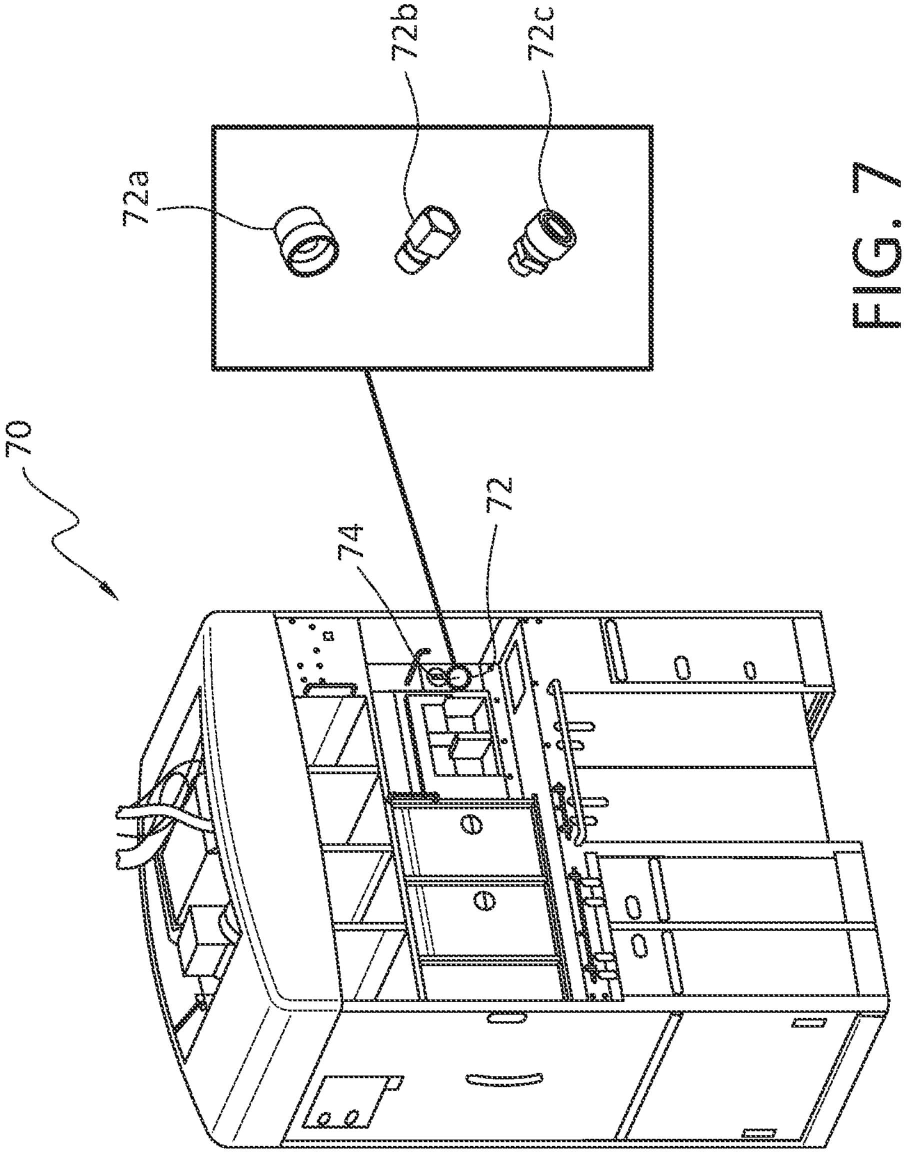
Figure 8:
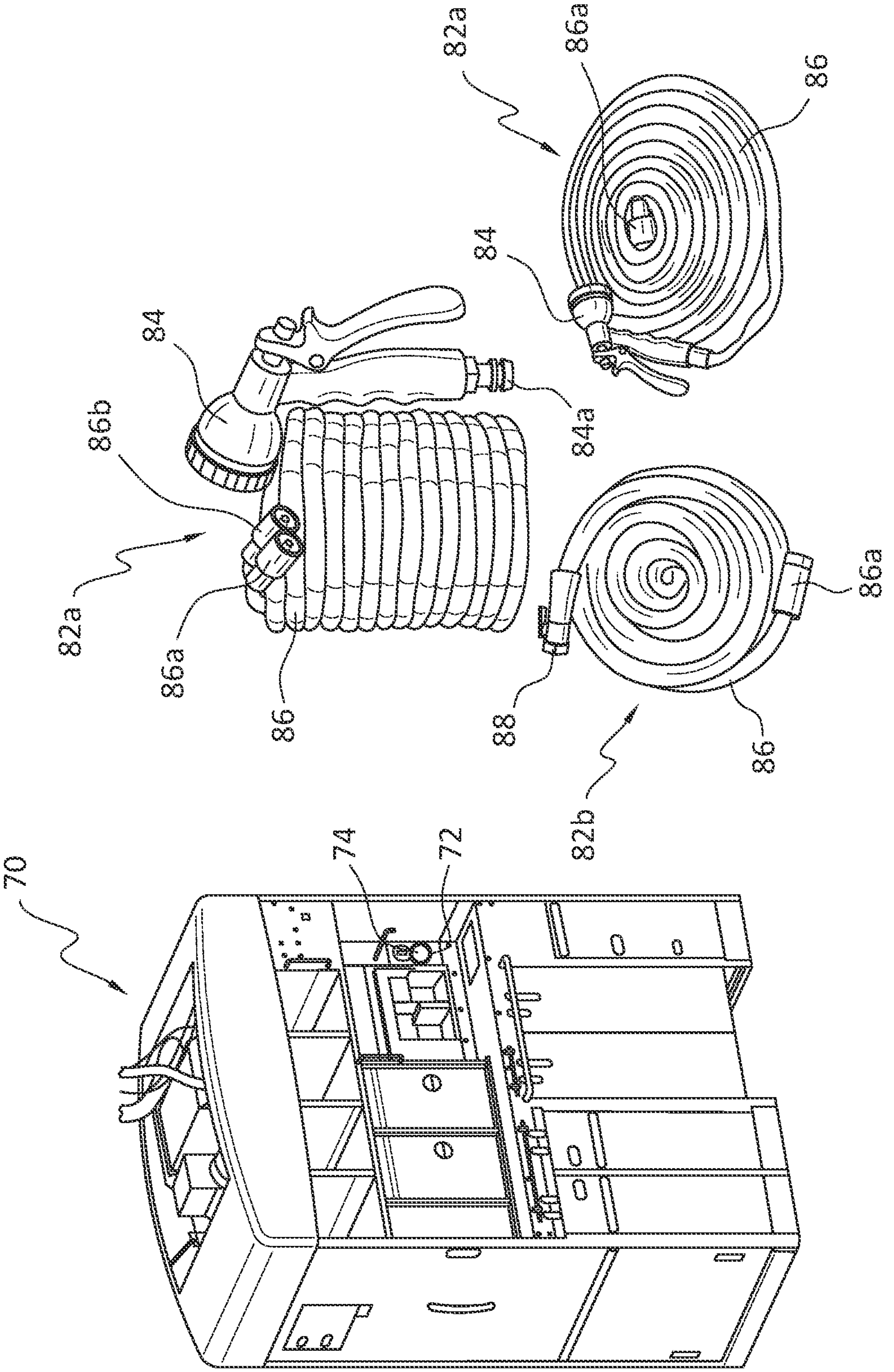
Figure 8B:
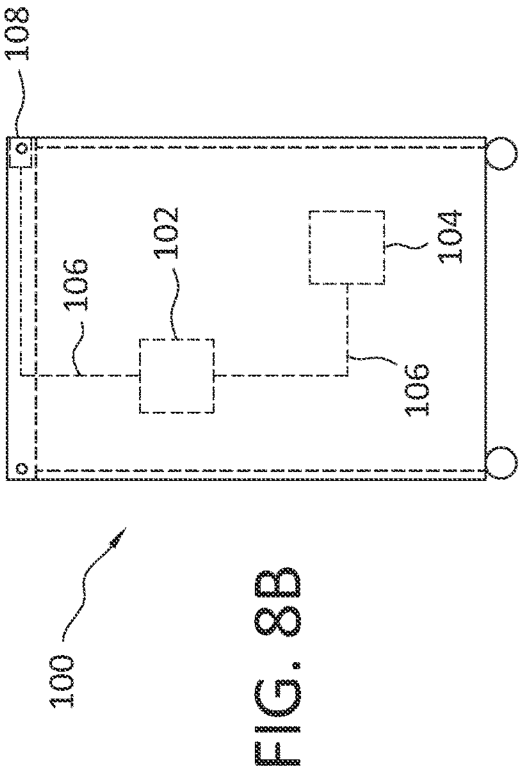
Figure 8D:
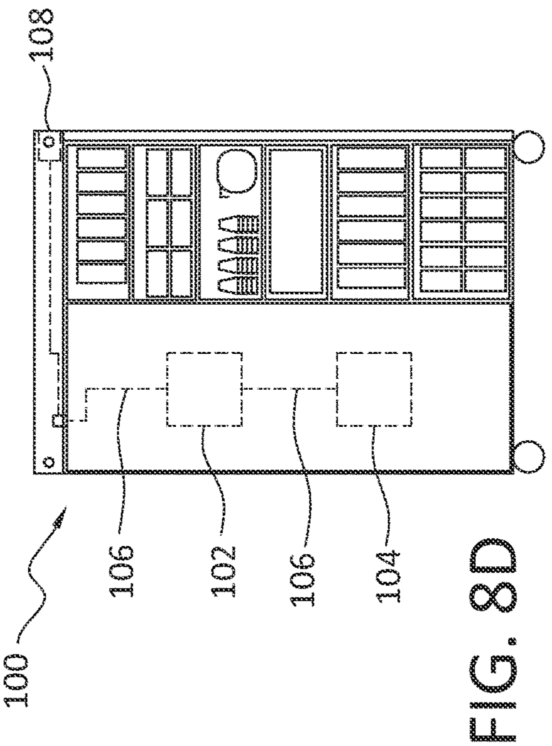
Figure 8A:
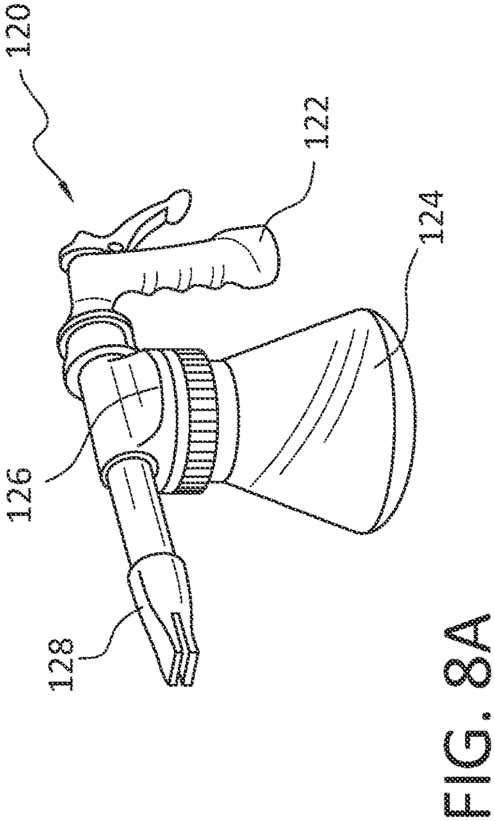
Figure 8C:
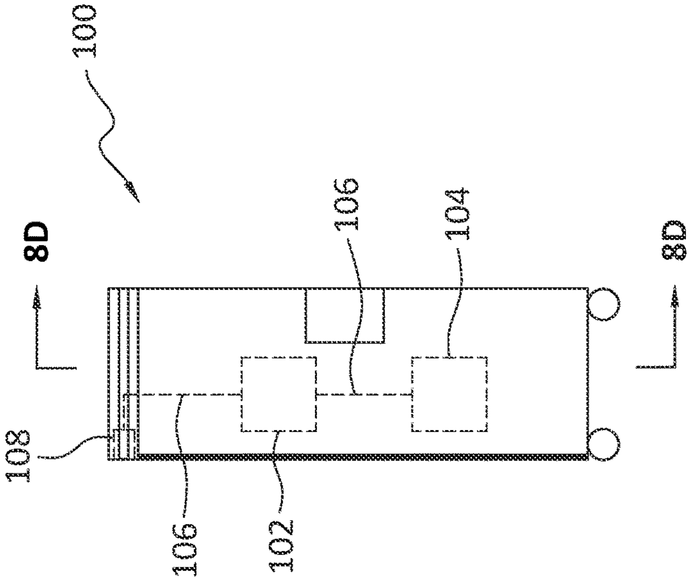
Figure 9:
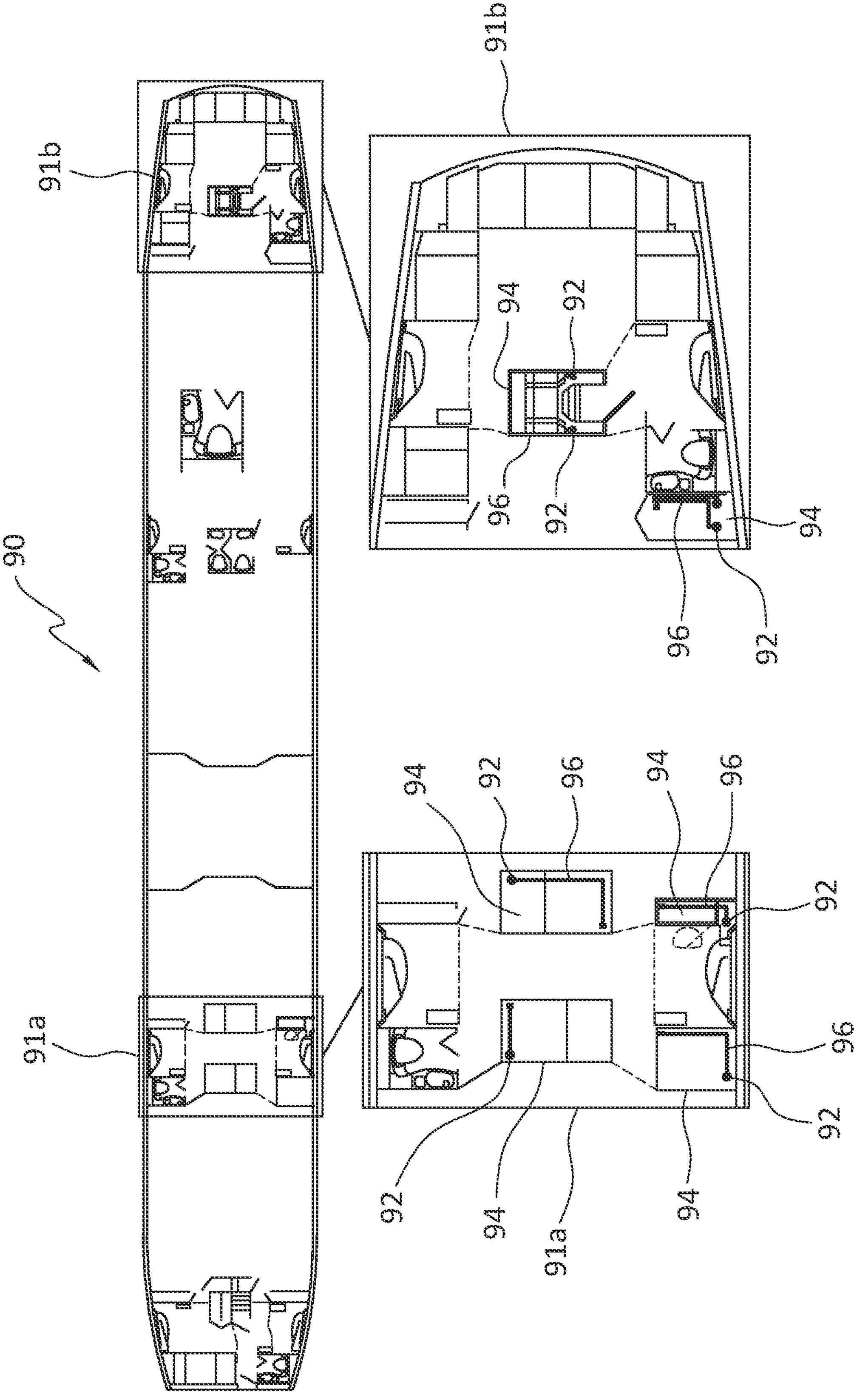
Figure 10:
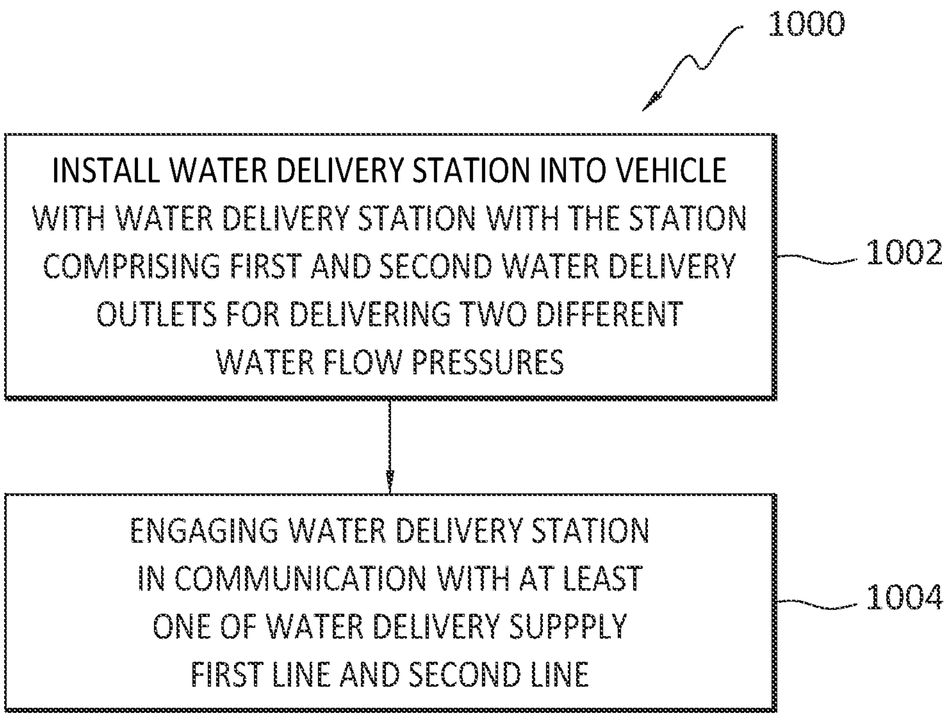
Figure 11:
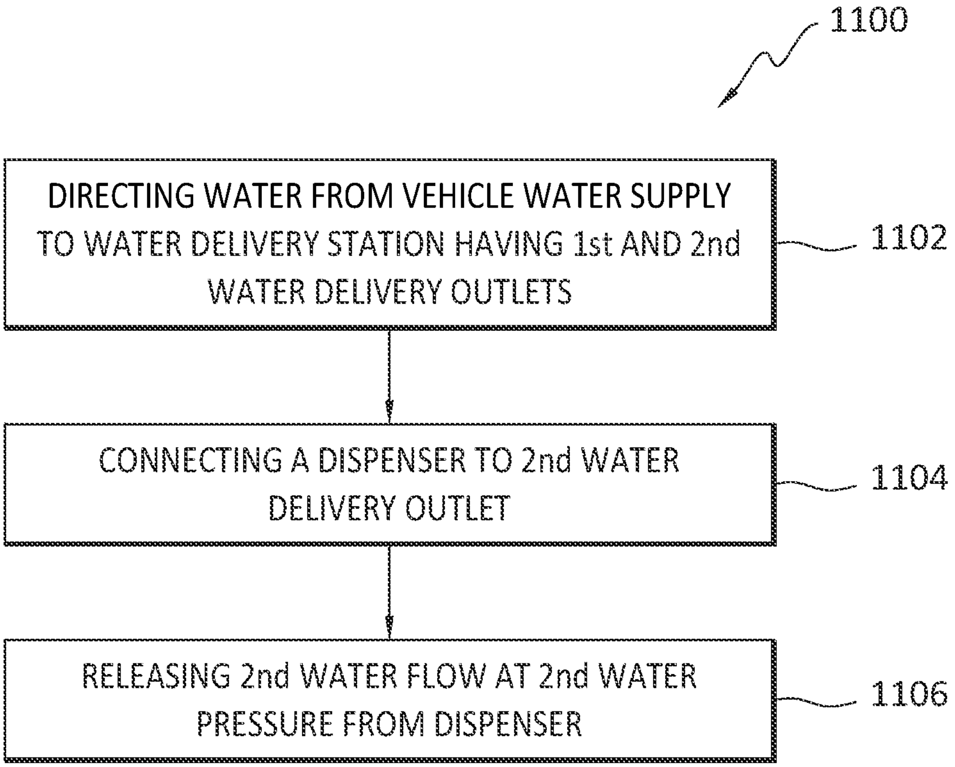
Figure 12:
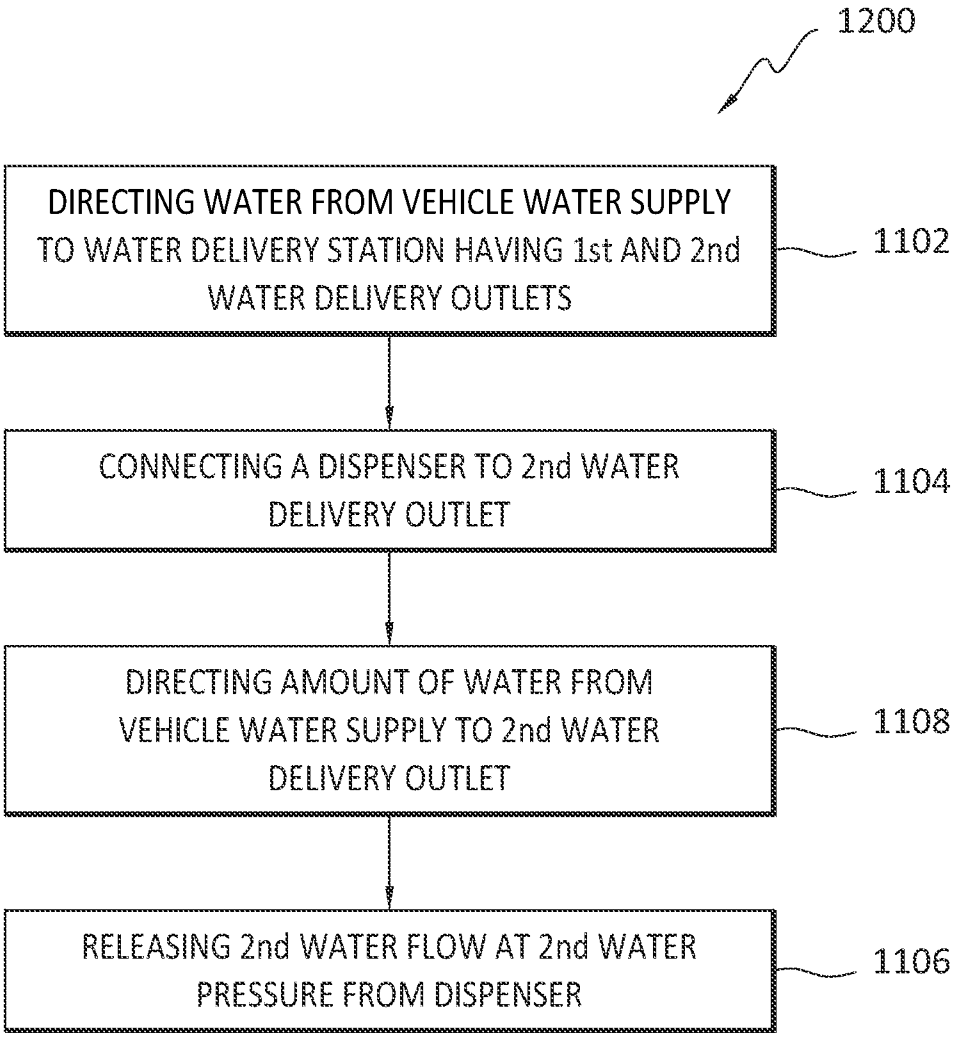
Figure 14:
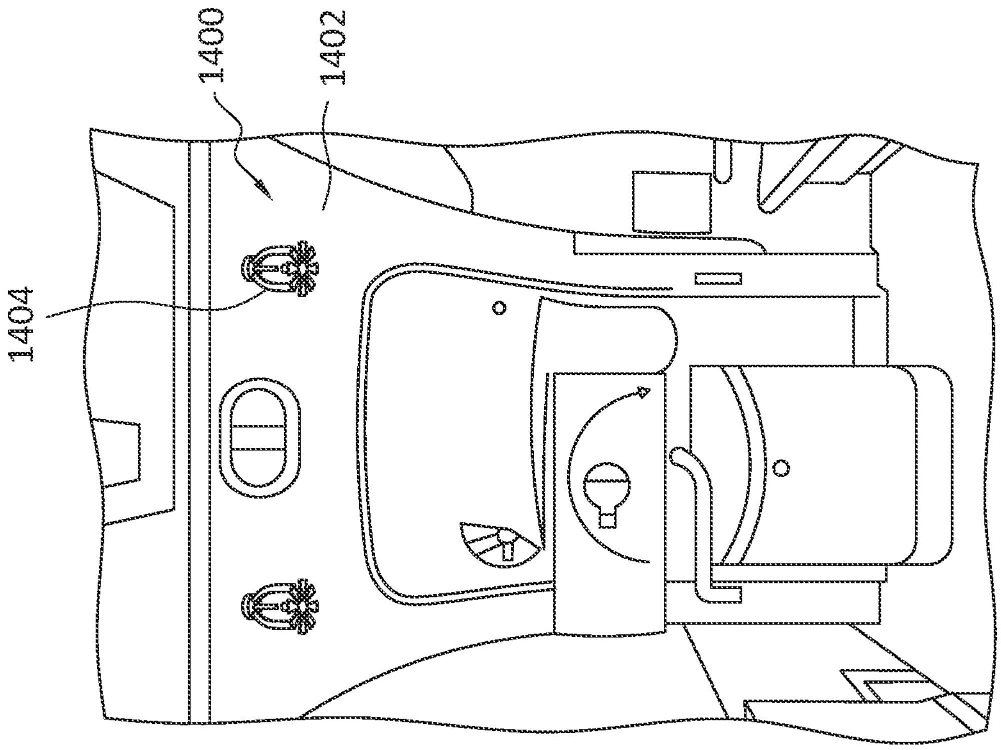
Figure 13:
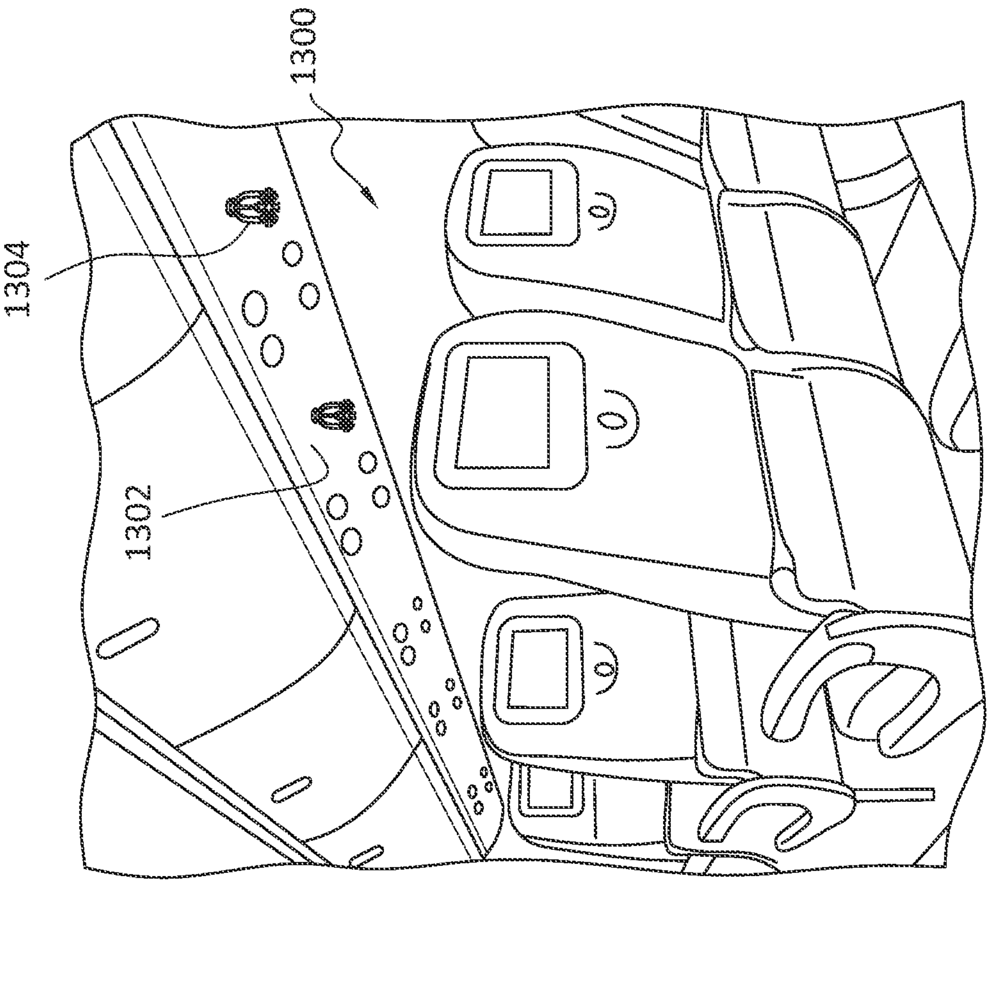
Figure 15:
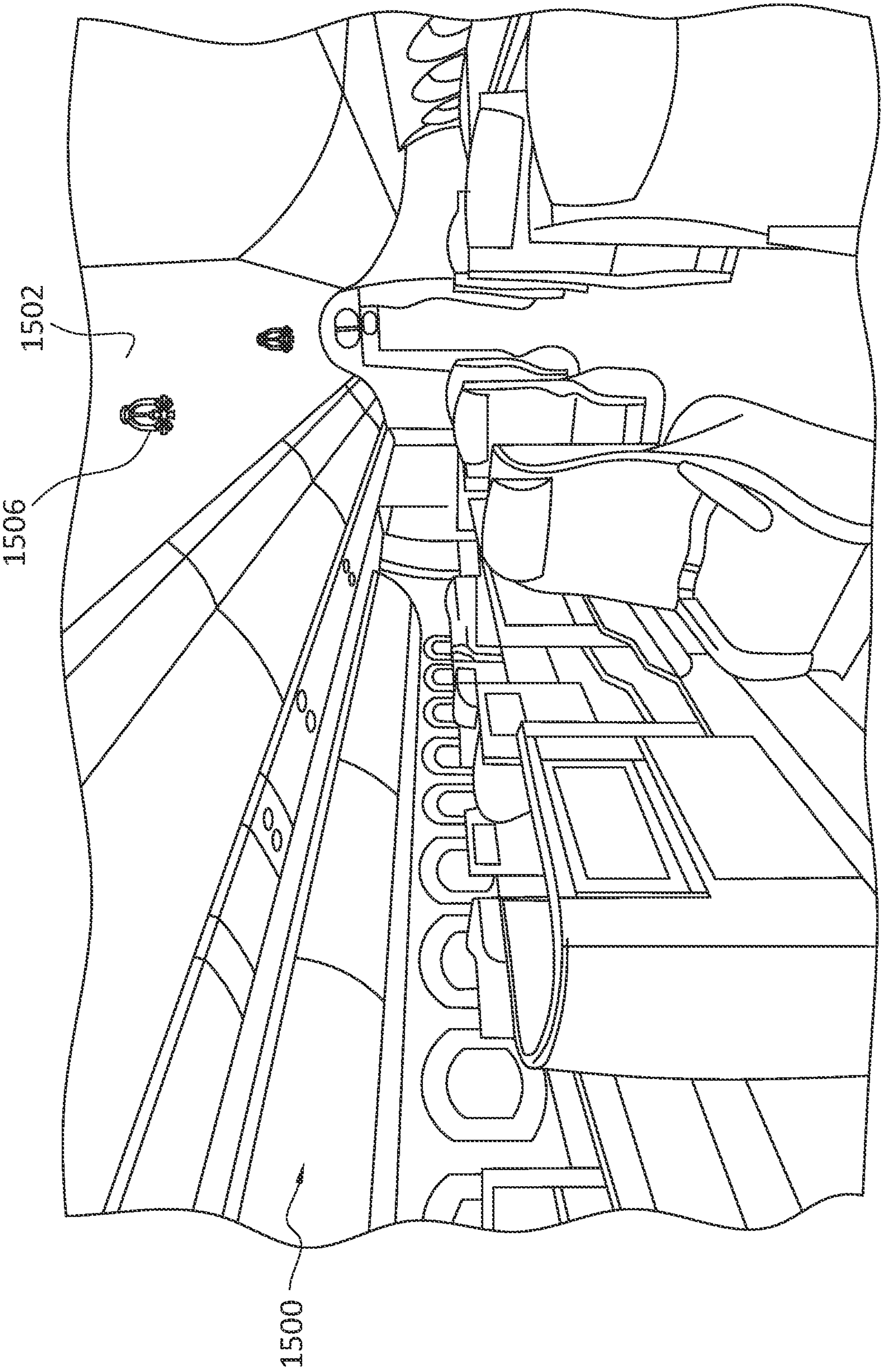
Figure 16:
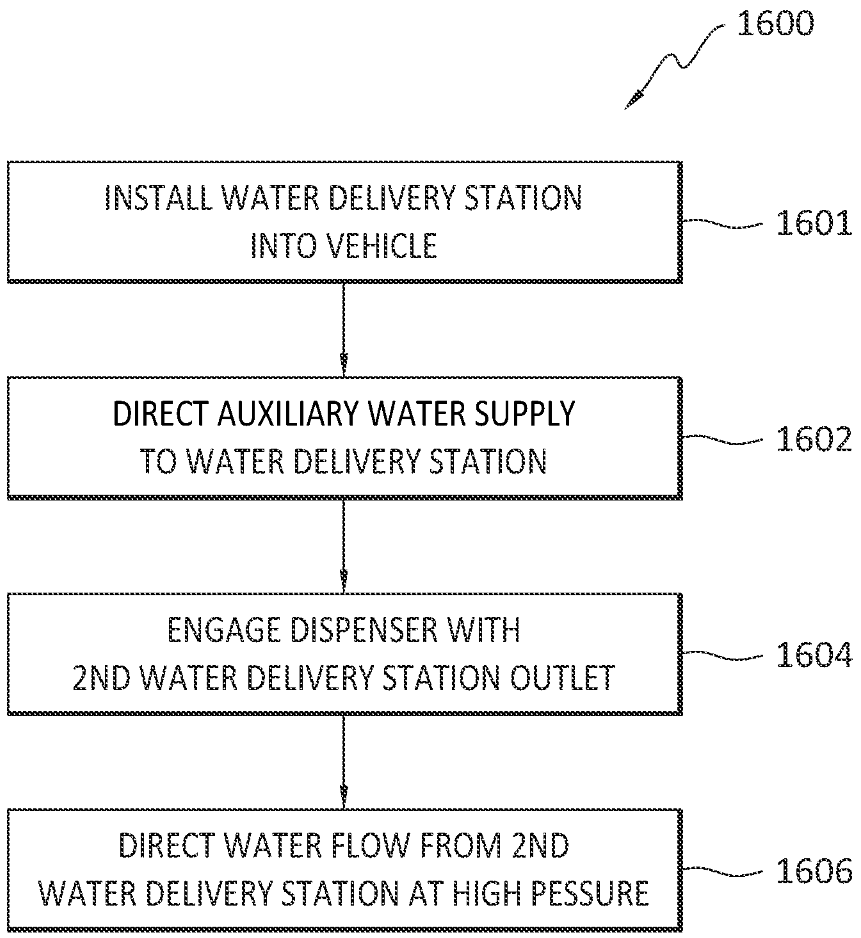
Figure 17:
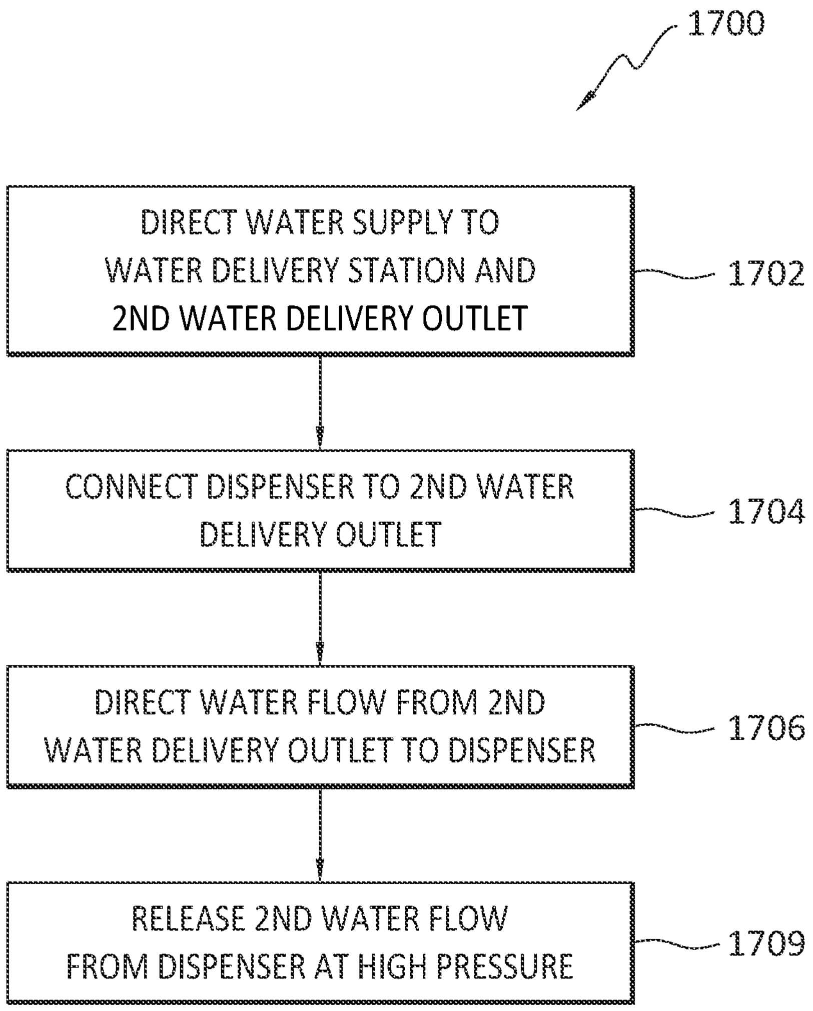
Figure 18:
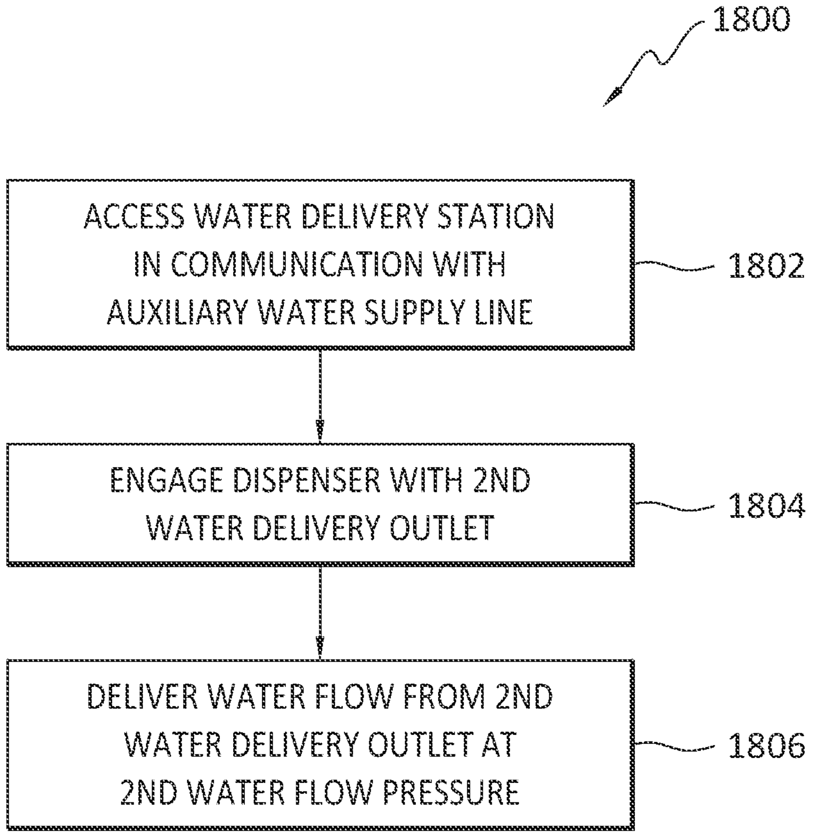
Figure 19A:
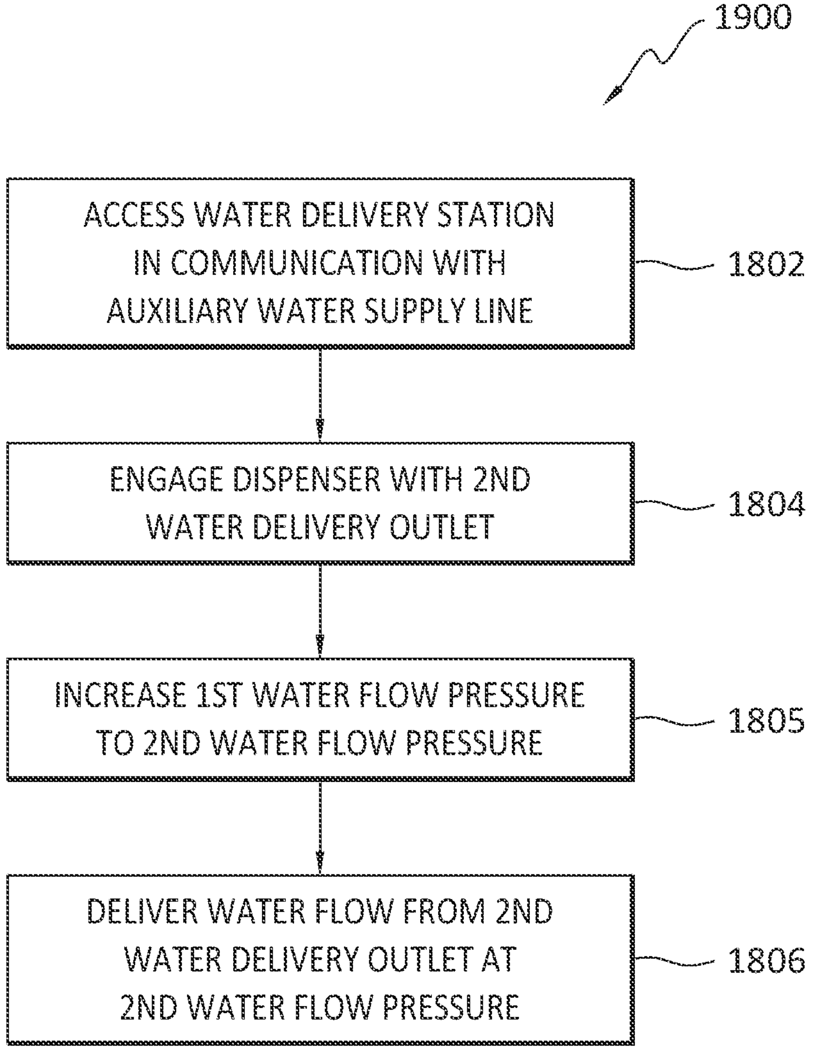
Figure 19B:
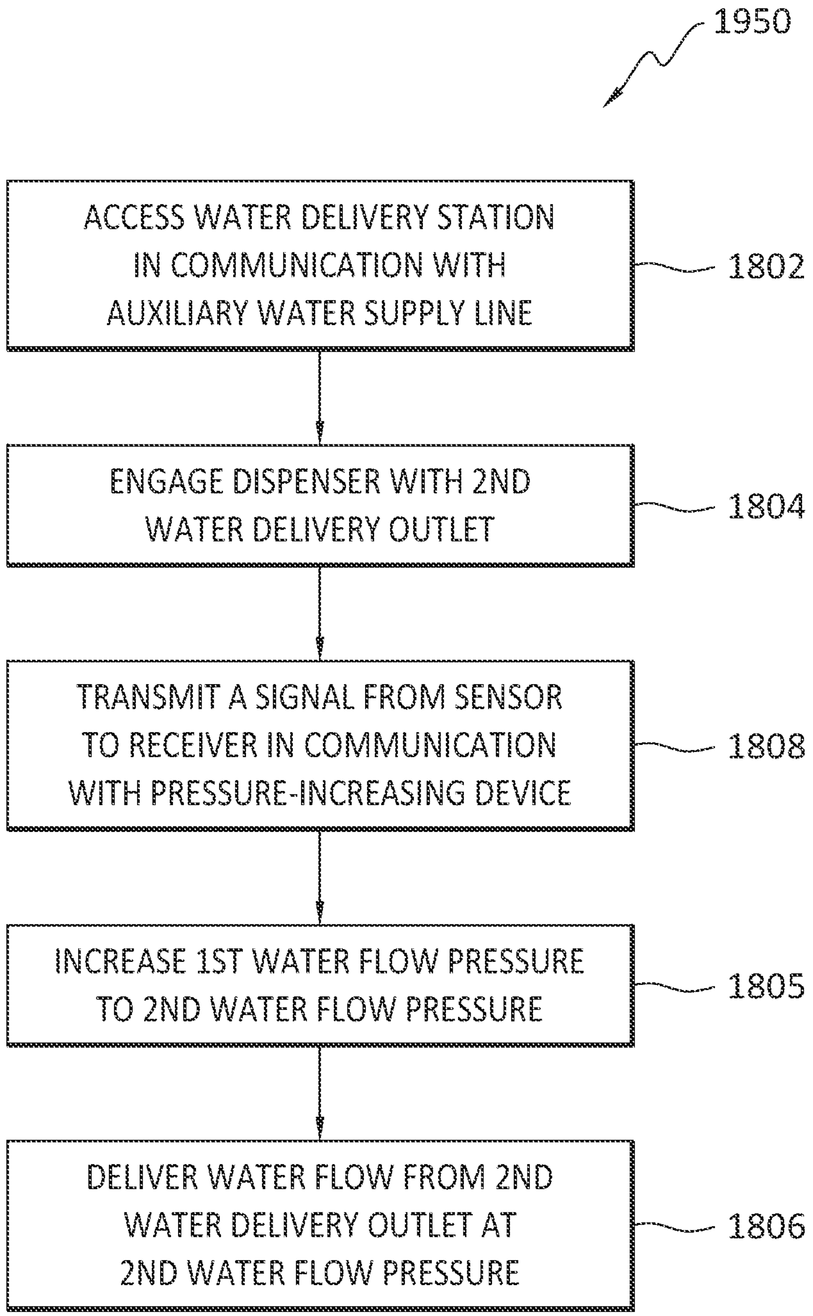
Figure 20:
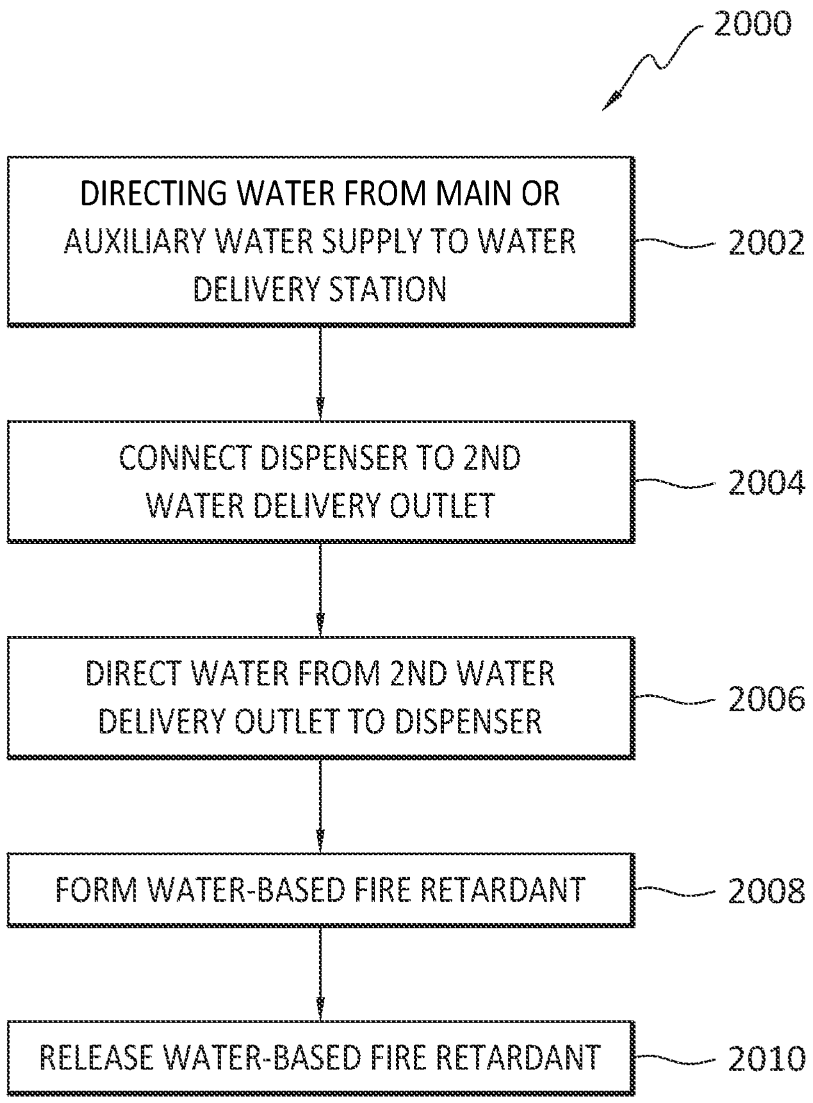

Having thus described variations of the disclosure in general terms, reference will now be made to the accompanying drawings, which are not necessarily drawn to scale, and wherein:

FIG. 1 is a representative illustration of a water delivery system according to present aspects;

FIG. 2 is a representative illustration of a water delivery system according to present aspects;

FIG. 3 is an overhead, partial cutaway view of a water delivery system for a vehicle (in the form of a passenger aircraft) illustrating water delivery flow paths according to present aspects;

FIG. 4 is a partial cutaway side view of a water delivery system for the vehicle shown in FIG. 3 (in the form of a passenger aircraft) illustrating water delivery flow paths according to present aspects;

FIG. 5 is an overhead, partial cutaway view of a water delivery system for a vehicle (in the form of a passenger aircraft) illustrating water delivery flow paths according to present aspects;

FIG. 6 is a partial cutaway side view of a water delivery system for the vehicle shown in FIG. 5 (in the form of a passenger aircraft) illustrating water delivery flow paths according to present aspects;

FIG. 7 is a perspective view of a water delivery station, with an enlarged view of exemplary second water delivery outlets according to present aspects;

FIG. 8 is a perspective view of a water delivery station, as shown in FIG. 7, and further showing exemplary dispensers that can engage the exemplary second water delivery outlets according to present aspects;

FIG. 8A is a perspective view of a dispenser according to present aspects;

FIG. 8B is a side view of a water delivery station according to present aspects;

FIG. 8C is a front view of a water delivery station of the type shown in FIG. 8B, according to present aspects;

FIG. 8D is an exposed side view of the water delivery station of FIG. 8C, with an exposed view taken along line 8D-8D shown in FIG. 8C, according to present aspects;

FIG. 9 is an overhead, partial cutaway view of a vehicle in the form of a passenger aircraft illustrating locations of water delivery stations according to present aspects;

FIG. 10 is a flowchart outlining a method according to present aspects;

FIG. 11 is a flowchart outlining a method according to present aspects;

FIG. 12 is a flowchart outlining a method according to present aspects;

FIG. 13 is an illustration showing overhead mounted dispensers according to present aspects;

FIG. 14 is an illustration showing overhead mounted dispensers according to present aspects FIG. 15 is an illustration showing overhead mounted dispensers according to present aspects FIG. 16 is a flowchart outlining a method according to present aspects;

FIG. 17 is a flowchart outlining a method according to present aspects;

FIG. 18 is a flowchart outlining a method according to present aspects;

FIG. 19A is a flowchart outlining a method according to present aspects;

FIG. 19B is a flowchart outlining a method according to present aspects;

FIG. 20 is a flowchart outlining a method according to present aspects; and

Figure 21:
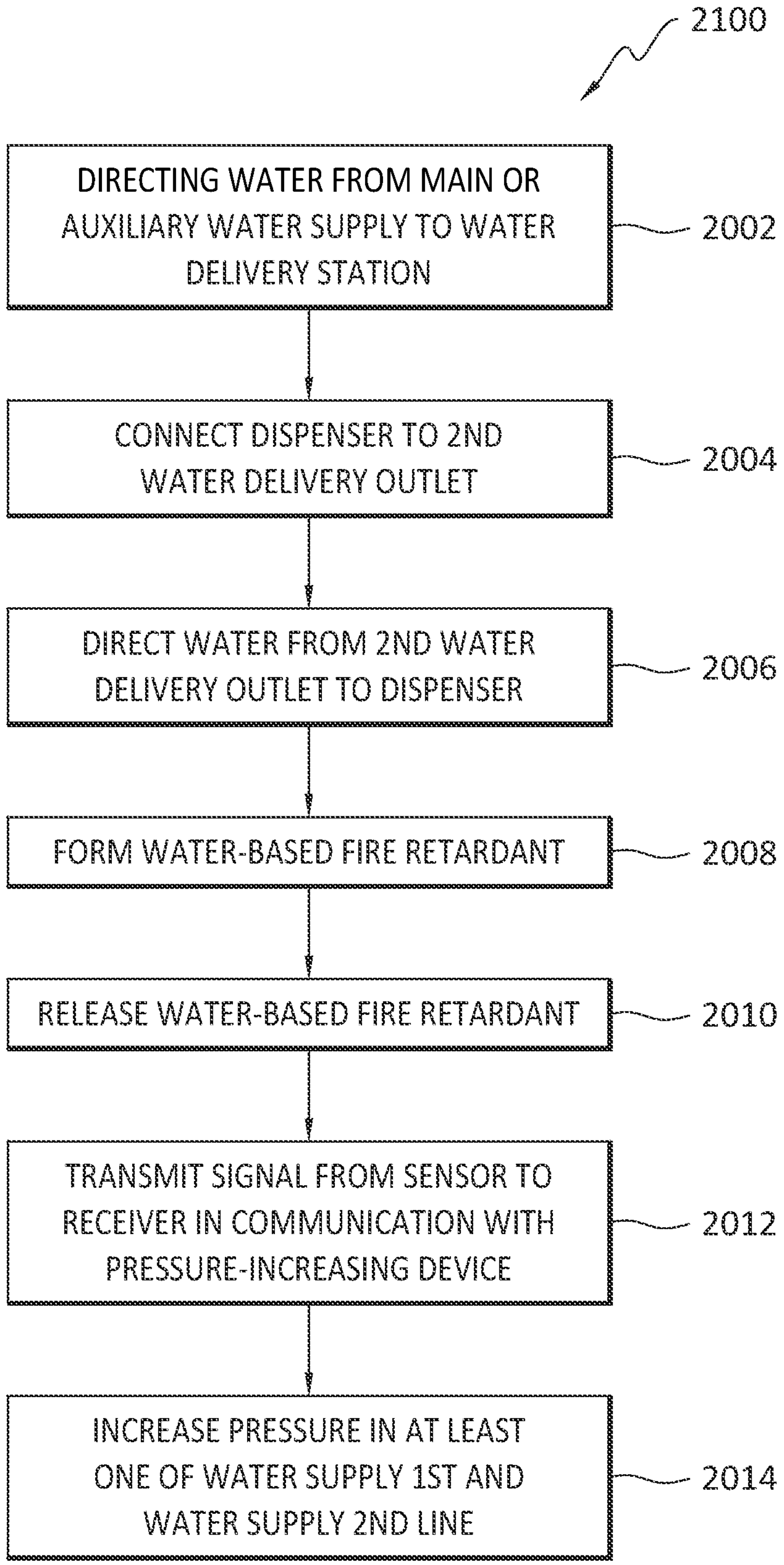

FIG. 21 is a flowchart outlining a method according to present aspects.

DETAILED DESCRIPTION

Present aspects are directed to fire suppression apparatuses, systems, and methods that can use pre-exiting water supplies in vehicles and pre-existing water delivery stations, or "monuments" as fire suppressants, especially for the purpose of dousing a chemical fire more effectively by addressing the need to dissipate the heat generated by a battery fire such that the battery does not re-ignite.

Vehicle cabins, including, for example, passenger aircraft cabins, are equipped with a plurality of water delivery stations, typically located in the galleys and in the lavatories. Such water delivery stations direct water from a water supply (e.g. one or more water tanks) that can typically hold a supply of potable water, and that can range in tank capacity (e.g., volume capacity, etc.) from, for example, ranging from about 100 to about 250 gallons of water, depending on the size of the aircraft, etc. While the water stored and dispensed (equivalently referred to herein as "delivered") onboard is potable, modern travelers typically drink bottled water. As a result, the onboard water is largely used for toilet flushing functions and for handwashing, resulting in a significant amount of water remaining in the water tanks of aircraft after a given flight (sometimes as much as one-third to one-half of the water tank capacity going "unused").

While fire extinguishers are mandated and carried onboard passenger aircraft, presently disclosed systems have the ability to discharge significant quantities of water to douse certain types of fires requiring a dissipation of continuing heat (such as, for example, battery fires that can originate in passengers' personal electronics, etc.) without adding the weight of additional fire suppression equipment to an aircraft. Accordingly, present aspects seek to modify existing (also equivalently referred to herein as "pre-existing") onboard water delivery systems, (with the water delivery systems including water supply or supplies, plumbing, and water delivery station components), to enable the use of a fire suppressant resource that is typically already present in a passenger aircraft; namely, water alone, or water in combination with a further fire suppressant or fire-retardant compound.

According to present aspects, water delivery stations on passenger aircraft (referred to equivalently herein as "monuments") act as centralized outlets for the delivery of water for water-related uses. Such water related uses include, for example, lavatory flushing and lavatory washing, and various uses relating to rinsing, washing, food and drink preparation, etc. that typically occurs in a passenger aircraft galley. Accordingly, a passenger aircraft can include a plurality of water delivery stations located throughout the aircraft, with the total number of water delivery stations ranging from 2 to 10, or more, depending upon the size of the aircraft.

FIG. 1 is a diagram of a water delivery system 10, representing the system and including certain elements of the type incorporated into a vehicle 1 such as, for example, a passenger aircraft. The vehicle 1 is shown comprising a vehicle cabin 2 and an equipment bay 3 that can be located outside of the vehicle cabin 2 (e.g., beneath the floor of the vehicle cabin 2). As further shown in FIG. 1, the water delivery system 10 includes a water supply 12 that can be contained in one or more water tanks. Located in the equipment bay 3 with the water supply 12, pump 14 is shown in communication with the water supply 12 via a water line 16 that, for example, can be tubing made from any suitable material including metals, plastics, ceramics, etc., and that can have a predetermined inner diameter that can be selected to cooperatively achieve, maintain, and withstand system pressures required to operate the water delivery system. For example, when in operation, the pump 14 is engaged to provide a positive pressure to the water delivery system 10 for the purpose of placing the water delivery system under a pressure ranging from about 10 to about 40 psig. According to a present aspect, when in operation the pressure of the water delivery system in normal operation is typically maintained at a pressure of about 30 to about 40 psig., (e.g., about 35 psig.) As further shown in FIG. 1, water line 16 directs water from the water supply to plumbing assembly 18 that can include, for example, valves, emergency shutoffs, monitoring sensors, etc., and the water line 16 is shown exiting plumbing assembly 18 and continuing to feed a water flow to water delivery stations 19, and with the waterline continuing to feed a water flow to the water delivery station first outlets 19*a* and, according to present aspects, with the water line 16 continuing to feed a water flow to water delivery station second outlets 19*b*. The water delivery stations can be located throughout a vehicle (e.g., a passenger aircraft, etc.) in locations including, for example, galleys and lavatories.

FIG. 2 is a side view illustrating further aspects of the water delivery system 20 in a vehicle, according to present aspects. As shown in FIG. 2, a vehicle cabin 22 is located above equipment bay 21, with equipment bay 21 containing many of the mechanical components of the water delivery system 20. As shown in FIG. 2, a plurality of water tanks 23*a*, 23*b*, 23*c* are in communication with a plurality of pumps 24 via water supply lines 25. The water tanks can comprise or otherwise be in communication with components of the water delivery system, with such components including sensors, valves, emergency shutoffs, motorized fill/vent valves, motorized overflow valves, check valves, filters, multi-position switches, etc. that, in combination and in predetermined operational sequencing facilitate a distribution of a pressurized flow of water from the water tanks 23*a*, 23*b*, 23*c* through the vehicle to predetermined destinations located throughout the vehicle cabin. Collectively, the water delivery system components listed above in addition to water delivery system components not specifically listed are referred to herein as the water delivery system "plumbing" and/or water delivery system "plumbing components".

Return flows of "spent" water used in vehicle lavatories and galleys can return from the water delivery stations to a return or "holding" tank (not shown in FIG. 2) through a series of plumbing lines and attendant devices. Accordingly, FIG. 2 shows skin ports 30 in communication with fuselage skin 32 and further in communication with motorized system drain ports 34 and motorized tank drain valve 36. Check valves 38 are shown in communication with the motorized tank drain valve 36 and pumps 24 that are further in communication with water tanks 23*a*, 23*b*, 23*c* that each can comprise sensors (not shown in FIG. 2) to monitor the usage and remaining capacity of an available water supply contained in the tanks. Though the tank capacities can vary, for illustration purposes, as shown in FIG. 2 each tank, for example, can have a capacity of up to 130 gallons, or more.

As further shown in FIG. 2 the water delivery system 20 can deliver water to one or more forward-cabin lavatory 42*a*, one or more mid-cabin lavatory 44*a*, and one or more aft-cabin lavatory 46*a*, as well as deliver water to one or more forward-cabin galley 42*b*, one or more mid-cabin galley 44*b*, and one or more aft-cabin galley 46*b*. As further shown in FIG. 2, water delivery system 20 can further support and otherwise direct water to systems requiring water including, for example, humidifier 47.

According to present aspects, existing water sources (e.g., water sources held in existing water supplies of the types shown in FIGS. 1 and 2, etc.) act as the source of water delivered to the fire suppression systems disclosed herein. Similarly, the existing water delivery system plumbing components of a water delivery system in a vehicle are employed, with modification described herein, for the purpose of delivering water to the fire suppression apparatuses, systems and methods described herein. In addition, the existing water delivery stations, or "monuments" (e.g., water delivery stations present in a vehicle for the purpose of dispensing water in lavatories and galleys, etc.) are further employed, with modification described herein, for the purpose of delivering water to and from such modified water delivery stations at a significantly higher pressure than the pressures of the existing water delivery systems for the purpose of, for example, eradicating a fire in a vehicle cabin. As used herein, with respect to the release of water from a water delivery station, a water delivery outlet, and a dispenser, water is said to be "delivered" or "dispensed" or "released" from a water delivery station, a water delivery outlet, and from a dispenser engaged with or otherwise connected to a water delivery outlet, with the terms "delivered", "dispensed", and "released" used equivalently and interchangeably herein with respect to a water flow that can be a pressurized water flow.

FIG. 3 and FIG. 4 illustrate a vehicle in the form of a passenger aircraft, and further illustrate the location of existing components comprising an existing water delivery system in the representative vehicle presented. FIG. 3 is an overhead partial cutaway and partially exposed overhead view of a vehicle 50 in the form of a passenger aircraft, and further illustrate the location of various elements of an existing water delivery system in the vehicle. As shown in FIG. 3, water tanks 52 are shown in the aft of the vehicle, with water line 54 in communication with the water tanks 52. During operation of the water delivery system shown in FIG. 3, when a pump (not shown in FIG. 3 or 4) is engaged to establish and maintain a working water delivery pressure, water is directed from the water tanks 52, through the water line 54 to a plurality of water delivery stations located throughout the vehicle 50. The water delivery stations, as shown in FIG. 3, comprise lavatory water delivery stations 56 located in lavatories and galley water delivery stations 58 located in galleys. The pumps used to establish a positive pressure in the water delivery system to generate a predetermined water flow for galley and lavatory purposes produce a pressurized water flow in the water delivery system, with the water flow having a water flow pressure ranging from about 10 to about 40 psig, and more preferably ranging from about 30 to about 40 psig.

FIG. 4 is a partial cutaway and partially exposed side view of vehicle 50 in the form of a passenger aircraft, and further illustrating the location of various elements of an existing water delivery system in the vehicle 50, as also shown in FIG. 3. As shown in FIG. 4, during operation, water is delivered from water tanks 52 through water line 54 to water delivery stations 56 located in lavatories (and also to water delivery stations located in galleys as shown in FIG. 3, but not shown in FIG. 4). Additional existing plumbing components of the existing water delivery system are shown in FIG. 4, including plumbing lines 59 that lead from the water line to skin ports (not shown in FIG. 4), and that allow "spent" water from lavatories and galleys to exit the vehicle during, for example, vehicle maintenance and/or servicing. Plumbing line 59*a* is in communication with water tank 52, with the understanding that, with appropriate valving, plumbing line 59*a* can facilitate both emptying water tanks 52 and/or filling water tanks 52.

FIG. 5 and FIG. 6 illustrate a vehicle in the form of a passenger aircraft, and further illustrate the location of components comprising a water delivery system in the representative vehicle presented together with added water delivery system components used to facilitate the delivery of water for use as a fire suppressant from an existing vehicle water supply, but, according to present aspects, with the addition of dedicated water supply lines. That is, FIGS. 5 and 6, according to present aspects, illustrate the modification of an existing water delivery system in a passenger aircraft by adding additional water supply lines that can extend from an existing aircraft water supply, with the additional water supply lines dedicated to operate at higher pressures for the purpose of accommodating a fire suppression system onboard the aircraft. The additional water supply lines (also equivalently referred to herein as "dedicated water supply lines" or "auxiliary water supply lines" or "water supply second line(s") are further in communication with aircraft water delivery stations and are present in the system in addition to the existing water supply lines (referred to equivalently here as the "main water supply lines") that can extend from the water tanks to the water delivery stations. According to present aspects, the water supply second line(s) can operate separately from (and at higher pressures than) the existing water supply lines.

The existing vehicle water delivery system plumbing shown in FIGS. 3 and 4 delivers water through the system at a given low pressure adequate to support lavatory and galley water needs, with the pressure of the water flow ranging from about 10 to 40 psig, with the standard flow called for ranging from about 30 to about 40 psig. (e.g., about 35 psig.). According to present aspects, the water flow used for fire suppression can be pressurized to a much higher pressurized water delivery system (e.g., to a working "higher" pressure ranging from, for example, about 100 to about 150 psig.).

According to further present aspects, to achieve the additional pressure needed, the existing water delivery system can be modified by incorporating additional pumps, or by implementing pumps able to provide variable pressures, for example, on demand, to the system (including pressures ranging from, for example, about 100 to about 150 psig), and/or by incorporating pressure-increasing components in the water delivery system such as, for example venturi valves, or tubing of varying internal diameters that produces a Venturi effect, or by providing an air pressure source available onboard an aircraft as, for example, bleed air, etc.

According to present aspects, pressure-increasing components can be incorporated at points along the water delivery system, including at the water delivery station, and the pressure-increasing components can be in communication with a separate water delivery station outlet that can be dedicated to the fire suppression "mode". Water delivery stations and dispenser that can be in communication with or that can themselves incorporate pressure-increasing components are shown in FIG. 7 and FIG. 8 herein.

According to further aspects, the increased water flow pressure used for fire suppression can be achieved by the placement of additional pumps into the existing water delivery system, or by triggering existing pumps that can be modified to deliver variable pressure to an existing water supply line (FIGS. 3 and 4) or to a dedicated water supply line (FIGS. 5 and 6) of the present water delivery systems, with the change in water flow pressure (e.g., the change in the pumping pressure) achieved, for example, on demand, or via various sensing, signaling (e.g., transmitting and receiving) and/or triggering or actuating mechanisms in communication, and set forth herein.

According to further aspects, the water delivery systems used to deliver water to the water delivery stations for fire suppression purposes (and at the required, significantly elevated water pressure ranges), achieve, for example, a water pressure increase (above existing water delivery system water pressures) ranging from a water pressure increase (e.g., a water pressure differential from the existing water pressure) of from about 60 to about 140 psig., or more.

FIGS. 5 and 6 illustrate a vehicle in the form of a passenger aircraft, and further illustrate the location of existing but modified components comprising an existing water delivery system in the representative vehicle presented in FIGS. 3 and 4, and further illustrate the addition of dedicated water lines, shown in FIGS. 5 and 6 as broken lines. According to present aspects, FIG. 5 is an overhead partial cutaway and partially exposed overhead view of a vehicle 60 in the form of a passenger aircraft, and further illustrating the location of various elements of an existing water delivery system in the vehicle. According to a present aspect, FIG. 6 is a partial cutaway and partially exposed side view of vehicle 60 (as shown in FIG. 5) in the form of a passenger aircraft, and further illustrating the location of some elements of an existing water delivery system in the vehicle 50, as shown in FIG. 4.

As shown in FIGS. 5 and 6, water tanks 52 are shown in the aft of the vehicle, with water line 54 in communication with the water tanks 52. The water delivery stations, as shown in FIG. 5 and FIG. 6 can include water delivery stations 56 located in lavatories and water delivery stations 58 located in galleys. The pumps used to establish a positive pressure in the water delivery system to generate a predetermined water flow for galley and lavatory purposes produce a pressurized water flow in the water delivery system ranging from about 10 to about 40 psig., and preferably ranging from about 30 psig to about 40 psig.

As further shown in FIGS. 5 and 6, an additional or dedicated water line 64, shown as a broken line, is "dedicated" to the aspect of the water delivery system that will deliver a water flow, under significantly higher pressure, to the existing water delivery stations, thus converting the existing water delivery stations into "monuments" that can be used for conventional water delivery to, for example, lavatories and galleys, and that can also deliver and otherwise direct a higher pressure water flow from a water delivery station outlet for the purpose of fire suppression. In this way, the existing water delivery stations can deliver water for conventional use (and at "conventional lower pressures") in the galleys and lavatories, etc. and, as presently modified, the water delivery station modified further can be used, in the event of a fire, to provide and deliver a water significantly higher pressure water flow for use in fire suppression.

Though not shown in FIGS. 5 and 6, additional pumps can be in communication with dedicated water supply line 64 to provide, in operation and, for example, on demand, a significantly higher pressure water flow, for example, ranging from about 100 to about 150 psig. In further aspects, the dedicated water line can be in communication with the existing pumps, and the dedicated water line itself can further comprise, or is otherwise in communication with additional pressure-increasing devices. Such pressure-increasing devices can include variable speed pumps able to deliver varying (e.g., increased) pressures, venturi valves located in the dedicated water line 64, segments or "lengths" of the dedicated water line 64 having varying internal diameters to produce a Venturi effect and increase pressure in the dedicated water line, dedicated water delivery station outlets comprising venturi valves, a removable dispenser (e.g., a "quick-release" and easily attachable and releasable dispenser, etc.) in communication with the dedicated water delivery station outlet, and the dispenser itself can comprise a pressure-increasing device including, for example, a venturi device, etc.

As shown in FIG. 6, during operation, water is delivered from water tanks 52 under pressure from at least one pump (not shown in FIGS. 5 and 6) through water line 54 and through dedicated water line 64 to water delivery stations 56 located in lavatories (and further to water delivery stations located in galleys, as shown in FIG. 5, but not shown in FIG. 6). Additional existing plumbing components of the existing water delivery system are shown in FIG. 6, including plumbing lines 59 that lead from the water line to skin ports (not shown in FIG. 5), and that allow "spent" water from lavatories and galley to exit the vehicle at the skin ports during, for example, vehicle maintenance and/or servicing. As further shown in FIG. 6, plumbing line 59*a* is in communication with water tank 52. With appropriate valving (e.g., multi-positional valving, etc.) in place, plumbing line 59*a* can facilitate both emptying water tanks 52 and/or filling water tanks 52.

FIGS. 7 and 8 illustrate a water delivery station according to present aspects. As shown in FIGS. 7 and 8, water delivery station 70 is largely of the type that is already existing in a vehicle galley of, for example, a passenger aircraft. As shown in FIGS. 7 and 8, water delivery station 70 can include existing plumbing (e.g., plumbing including a water delivery outlet, for dispensing water at water flow pressures ranging from about 10 to about 40 psig.) and a low-pressure water delivery outlet 74. In addition, according to present aspects, water lines in the present watery delivery systems are directed to, or are otherwise in communication with, a high-pressure water delivery outlet 72 in the water delivery stations 70. Although FIGS. 7 and 8 show water delivery stations of the type typically existing in vehicle (e.g., passenger aircraft) galleys, present aspects further contemplate modifying water delivery stations (e.g., to include the high-pressure outlets) in water delivery stations typically existing in, for example, lavatories of vehicles including, for example, passenger aircraft.

As shown in the inset in FIG. 7, various types of connectors can be incorporated into the high-pressure water outlet (equivalently referred to herein as the "water delivery station second outlet"), including, for example, the connectors shown in FIG. 7 as an open-flow quick connect connector (connector 72*a*); a cam and groove coupling with or without shutoff valve (connector 72*b*); a spring-lock twist-claw hose coupling connector (connector 72*c*), etc.

Connectors including the types shown as connectors 72*a*, 72*b*, 72*c* are selected to provide external and internal features to facilitate the delivery of a high-pressure water flow from the water delivery station second outlet, for example, to assist in fire suppression. For example, the high-pressure water delivery outlets can comprise internal features to contribute to, or be solely responsible for, achieving a predetermined water flow high-pressure output that is significantly higher than the pressure of the water flow that is typically dispensed from the water delivery station for lavatory and galley functions, and that typically ranges from about 10 to about 40 psig., and that preferably ranges from about 30 to about 40 psig. That is, the high-pressure water delivery outlets can comprise internal features to contribute to, or be solely responsible for, achieving a predetermined water flow high-pressure output ranging from about 100 to about 150 psig.

To accomplish the pressure increase, according to present aspects, high-pressure water delivery outlets can comprise venturi valves, and/or other pressure-increasing features that can convert an incoming water flow (delivered to the water delivery station second outlet by a water line in the water delivery system) having a first pressure to an outgoing water flow exiting the water delivery station second outlet having a second pressure that is significantly higher than the first pressure, and that ranges, for example, from about 100 to about 150 psig. Further, the high-pressure water delivery station second outlet that is selected can include external outlet features designed to easily and quickly "mate" with a dispenser to form a "quick-release" arrangement between the dispenser and water delivery second outlet. For example, such external outlet features can include flanges, recesses, etc. of a predetermined dimension and/or geometry designed to satisfy the mating requirement of a dispenser selected to engage the high-pressure water delivery second outlet.

FIG. 8 shows the water delivery station 70 as shown in FIG. 7, with representative dispensers 82*a* and 82*b*. Dispenser 82*a* is shown as including a nozzle 84 (that can be, for example, a detachable nozzle) with nozzle connector 84*a* that is configured to releasably engage a hose outlet 86*b* of hose 86, with hose 86 further comprising a hose inlet 86*a*. Hose inlet 86*a* is configured to releasably mate with the high-pressure water delivery second outlet 72 in the water delivery stations 70. The hose inlet 86*a* can have a quick release arrangement to engage with a connector (e.g., a connector of the type shown as 72*a*, 72*b*, 72*c* in FIG. 7, etc.) in the high-pressure water delivery second outlet 72, or the hose inlet 86*a* itself can comprise the water delivery outlet connector that is configured to mate (e.g., releasably mate) with and otherwise engage the water delivery outlet.

Further, internal features in the dispensers (not shown) can regulate or otherwise contribute to water flow pressure increases by including, for example, a venturi valve in the dispensers 82*a*, 82*b* and/or in the nozzles 84, 88. In addition, varying the internal diameters along the length of the dispenser hose 86 can cause or contribute to a Venturi effect, etc. According to further aspects, the hose 86 can be an expanding hose of the type having a storage length that is significantly shorter (e.g., to facilitate storage, etc.) than a deployed length during use when a water flow passes through the hose. The selected hose length will be a length required, for example, by safety or other operational regulations, and that further can be of a length such that a predetermined passenger seating area that is a certain distance from a water delivery station can be "covered" for purposes of extinguishing a fire, with predetermined overlap of passenger seating areas achieved. That is, according to present aspects, dispensers comprising hoses, for example, from two or more water delivery stations can reach a predetermined passenger seat, allowing for flexibility throughout the presently disclosed systems, apparatuses, and methods.

The nozzle 84 shown in dispenser 82*a* can attach to or detach from the hose outlet 86*b* by a mating configuration, that can be a threading arrangement, a quick release mating arrangement, or by another mating arrangement that can facilitate attachment and detachment. As shown in FIG. 8, dispenser 82*b* can comprise a fixed nozzle 88 at an outlet end of the hose 86, and the dispenser 82*b*, as shown, further can include a hose inlet 86*a* configured to mate with or otherwise engage the high pressure water delivery station outlet 72. As with the dispenser 82*a*, in dispenser 82*b* the hose inlet 86*a* can have a quick release arrangement with the high-pressure water delivery outlet 72 via a connecter such as 72*a*, 72*b*, 72*c* as shown in FIG. 7, and/or the hose inlet 86*a* itself can comprise the high-pressure water delivery outlet connector that is configured to mate with and engage the water delivery outlet 72.

As shown in FIGS. 1, 2, 3, 4, 5, and 6, a substantially centralized water supply that exists in a passenger vehicle is accessed by the water-delivery stations that already exist in the "footprint" of a vehicle (e.g., a passenger aircraft), although, according to present aspects, such water delivery stations are modified and otherwise configured to also dispense water from an additional water delivery (second) outlet that is configured to dispense water from the water delivery station at a significantly higher pressure (e.g., ranging from about 100 to about 150 psig) than the existing water delivery (first) outlets used to dispense water from such existing lower pressure outlets in galleys and lavatories at lower pressures (e.g. ranging from about 10 to about 40 psig). The term "substantially centralized water supply" refers to a water supply that can be one or more water tanks that can be, for example, located in relatively close proximity to one another within a predetermined region of a vehicle. That is, when the vehicle is a passenger vehicle (e.g., a passenger aircraft), a water supply is typically stored in and dispensed from one or more water tanks that can be located, for example, in the equipment bay in the aft of the vehicle.

According to further aspects, water delivery systems are presently disclosed that can also include a discrete water supply that is separate from the existing water supply, or that can augment or replace a water supply shown in any of FIGS. 1, 2, 3, 4, 5, and 6. That is, rather than have a single water tank having a large water capacity ranging from about 100 to 130 gallons, etc., and from which water is pumped through water lines in the vehicle to the water delivery stations that can be located hundreds of feet from the water supply, further present aspects include positioning a water supply having a smaller capacity in closer proximity to one or more of the water delivery stations, or having a dedicated water supply in closer proximity to each water station (including present aspects where a water delivery station incorporates a dedicated or "auxiliary" water supply).

According to present aspects, total weight considerations and weight distribution considerations are taken into account in the design of various vehicles designed to carry large water supplies, including, for example, passenger aircraft. That is, present aspects recognize that additional overall weight of added water delivery system components, including the addition of auxiliary or replacement water tanks will not observe a net weight increase for the vehicle. According to present aspects, recognizing that the largest weight involved in a water delivery system can be the water itself, by distributing a plurality of water tanks having a smaller tank capacity as compared to the large volume capacity of a centralized water supply tank or tanks, and then locating the smaller capacity water supply tank or tanks proximate to a water delivery station, several economies as to weight can be achieved. Such weight economies include obviating the need for additional pumps, or requiring only pumps of a reduced size, obviating several components in the water distribution system including valves, filters, etc. According to present aspects, the total amount of water carried by a passenger vehicle can remain, for example, in the range of from about 120 to about 240 gallons of water or more, although according to present aspects, the entirety of the water supply can be decentralized such that the plurality of water supplies (e.g., the water tanks) located more proximate to the water delivery stations can require a capacity of, for example, about 10 to about 30 gallons in each water tank. According to further present aspects, the smaller capacity water supply tanks can require a thinner tank wall thickness, and can further be made from materials that are lighter in weight, since the forces on the tank walls in the smaller capacity tanks are less than the forces impacting the walls of the significantly larger, centralized, large-capacity (e.g., about 120 to about 240 gallon) water supply tanks.

FIG. 9 is an overhead partially exposed view of a vehicle 90 in the form of a passenger aircraft. FIG. 9 shows a forward service area 91*a* and an aft service area 91*b* having that each support one or more galleys and lavatories. According to present aspect, and as further shown in FIG. 9, a plurality of small capacity water supplies 92 are incorporated into or otherwise located proximate to water delivery stations 94 with the small capacity water supplies 92 and the water delivery stations 94 in communication with water lines 96. The small capacity water supplies 92 can have the previously mentioned water capacities of a predetermined volume that can be a smaller capacity as compared to a vehicle main water tank capacity. According to present aspects, the vehicle 90 can further include an existing "main" water supply (not shown in FIG. 9) in communication with the existing water delivery stations 94 via existing plumbing. When both the existing water supply and the plurality of small capacity water supplies (e.g., smaller capacity water tanks) are both present, the larger, existing tanks need not be filled to capacity and can serve or support, for example, the lower pressure functions required in galleys and/or lavatories as explained herein (e.g., "lower" pressure functions being those adequately served by a water pressure flow ranging from about 10 to about 40 psig). According to present aspects, the small capacity water supplies can be in communication with at least one pump and hardware configured to deliver a water flow from the high-pressure water delivery station second outlet of the water delivery station at higher pressures ranging, for example, ranging from about 100 to about 150 psig. for the purpose of fire suppression in the event of a fire.

According to further aspects, the dedicated water supplies shown in FIG. 9 can serve both low pressure and high pressure needs, on demand. For example, according to further aspects, in the event of a fire, a dispenser (shown, for example, in FIG. 8) can be engaged into the water delivery station. The act of engaging the dispenser into the water delivery station can manually, electronically, magnetically, etc., "trigger" the water delivery station to provide higher pressure through increased pumping pressure, for example, or the system can be activated manually by an appropriate switch. In addition, according to present aspects, the dispenser and/or the water delivery station second outlet can include or otherwise be in communication with a sensor that can sense the engagement of a dispenser into a water delivery stations second outlet. The sensor can include a transmitter for sending a signal to a receiver located in communication with or incorporated into a pressure-increasing device in the present systems.

According to further aspects, a need for a high-pressure condition can be sensed via remote sensors, with such sensors able to detect conditions including, for example, a sudden heat increase in a target zone in, for example, an aircraft cabin, or the development or presence of smoke in a target zone in, for example, an aircraft cabin, etc. The sensors can transmit a signal to: 1) a receiver incorporated into or in communication with (but located remotely from) the water delivery station; or 2) pressure-increasing devices within the water delivery station (e.g., pumps, etc.) to quickly build the pressure in the system to a pressure required to provide a higher pressured water flow for fire suppression, in substantially real time ("substantially real time" being a duration of time equal to a duration of time of less than a few seconds, etc.), and substantially on demand.

According to further aspects, the dispenser can remain engaged with the water delivery station with the dispenser in a stowed condition and contained in an easily accessible storage space in the water delivery station. Further, if regulations allow, the small capacity water supplies can be maintained in a pressurized state, such that, when a dispenser is in place and engaged with the water delivery station second outlet, and a higher pressure water flow is desired, the water delivery station can immediately dispense a water flow having a pressure ranging, for example, from about 100 to about 150 psig. for the purpose of, for example, fire suppression.

According to present aspects, when both a main, or existing, larger vehicle water supply and at least one "smaller" capacity water supply are present in the vehicle, the "smaller" capacity water supply can be referred to equivalently herein as an "auxiliary" water supply. For present purposes, the terms "smaller capacity water supply" and "auxiliary water supply" are equivalent terms and are referred to equivalently herein. According to present aspects, such smaller capacity water supplies (that can be auxiliary water supplies) can be incorporated into or otherwise integrated into or integral with the water delivery stations, or can be located in a location that is in closer proximity to the water delivery stations as compared to the distances between the location of the main vehicle water supply and a water delivery station.

In instances, where an auxiliary supply is integrated into the water delivery station, the length and weight of the water supply line from the auxiliary water supply to the water delivery station outlets can be significantly minimized. Further, in instances, where a smaller capacity water supply is integrated into a water delivery station, pressure-increasing mechanisms in communication with the smaller capacity water supply and smaller capacity water supply line can more efficiently deliver pressure increases to a contained water supply, and to a released water flow. According to present aspects, pressure-increasing devices can be, for example, one or more pumps (equivalently referred to herein as "compressors"), physical adaptations made to a water supply line or to a dispenser (and/or additional valves or other devices incorporated into water supply lines or to a dispenser) that create a Venturi effect, air sources in communication with the water supply or water supply line, etc. Air sources that can pressurize the presently described water delivery systems can include, for example, compressed air generated by a compressor, compressed air delivered from a pressurized cannister, air delivered from an aircraft engine, bleed air, etc., such that air is delivered to the present systems, for example, via an air delivery pathway.

FIGS. 8B, 8C, and 8D illustrate a water delivery station in the form of a galley service module incorporating features of the present systems, apparatuses, and methods. FIG. 8B is a side view of a galley service module. FIG. 8C is a front view of the galley service module shown in FIG. 8B. FIG. 8D is a partially exposed view of the galley service module shown in FIGS. 8B and 8C. As shown in FIGS. 8A, 8B, 8C galley service module 100 includes an auxiliary water supply 102, with the auxiliary water supply integrated into the galley service module 100, and with the auxiliary water supply 102 further in communication with a pressure-increasing device in the form of a pump 104, and with the auxiliary water supply 102 further in communication with an auxiliary water supply line 106. Auxiliary water supply line is further in communication with auxiliary water delivery outlet 108. Although not shown in FIGS. 8B, 8C, and 8D, auxiliary water delivery outlet 108 can comprise fittings such as, for example, the connectors 72*a*, 72*b*, 72*c* shown in FIG. 7, with such connectors configured to mate with a dispenser inlet, such as, for example, the dispenser inlet 86*a* of the type shown in FIG. 8.

Present aspects also contemplate placement of auxiliary water supplies outside of, and therefore not integral with, but proximate to water delivery stations. In such configurations, an auxiliary water supply can be located in a vehicle cabin, beneath the floor of a vehicle cabin structure, above the ceiling of a vehicle cabin structure, etc., and/or close enough to the location of an associated water delivery structure, such that the water delivery lines from an auxiliary water supply can connect to and otherwise be in communication with an associated water delivery station. According to present aspects, the water delivery line can comprise a predetermined length that is, for example, significantly less than the length of a main water supply line from a vehicle main water supply (e.g., a main water tank) to a water delivery station. According to present aspects, consideration of the length of a particular water delivery line can be factored into the required power and size of a pressure-increasing device used to place the auxiliary water supply under pressure for the purpose of providing a higher-pressured water flow for fire suppression, with the higher pressured water flow having a water flow pressure ranging, for example, from about 100 psig. to about 150 psig.

The pump 104 as shown in FIGS. 8B, 8C, and 8D is but one type of pressure-increasing device that can be used to pressurize a water flow from the water delivery station 100. Although not explicitly shown in the FIGs, present aspects contemplate incorporating into the present systems pressure-increasing devices of the type that can impose an increased pressure to the present systems via air pressure. Such air pressure can originate from systems already integrated into a vehicle (e.g., bleed air from, for example, a vehicle engine, etc.). The present systems can also include the incorporation, if regulations will allow, of additional pressurized air sources (e.g., pressurized cannisters) placed into communication with the auxiliary water supplies for the purpose of providing a predetermined increase in water system pressure for the purpose of directing a water flow from the water delivery station, on demand, to suppress and otherwise extinguish a fire.

According to present aspects, while present systems and methods can use pressurized water (pressurized to an increased pressure from the "typical", lower water pressure normally exiting from vehicle water station, for example in aircraft cabins) from the disclosed water delivery station(s) as the sole fire retardant (e.g., water alone being a fire retardant), to effectively suppress and extinguish a cabin fire on a vehicle, further present aspects contemplate the addition of a material to the water flow to form a water-based fire-retardant mixture, with the fire-retardant mixture released from the dispenser, on demand, when the dispenser is engaged with the water delivery station outlet.

FIG. 8A shows a non-limiting representation of a dispenser of the type useful with the present systems, apparatuses, and methods. As shown in FIG. 8A, a dispenser 120 comprises a mountable trigger handle 122 that can removably engage or otherwise be connected to a reservoir 124. As shown in FIG. 8A reservoir 124 that can removably engage with or otherwise connect to a mount 126, with the mount 126 providing a passageway for a water flow into and through trigger handle 122, into reservoir 124, out from reservoir 124 and out of dispenser 120 via nozzle 128.

According to further aspects, water-based fire-retardants can include materials such as, for example, flocculants ("flocculants" defined herein as compounds that can help other particles agglomerate), foaming agents, and other materials that, when water is added, can form water-based fire retardant mixtures. Foaming agents can include foam concentrates that, when mixed with water, form a foam solution. Foam concentrates useful according to present aspects, can include those foam concentrates having a mixing rate of, for example, 1%, 2%, 3%, 4%, 5%, 6%, etc. For example, a foam concentrate having a stated mixing rate of 1% would require 99 gallons of water and 1 gallon of foam concentrate. Fire-retardant foams and foam concentrates are known and available, for example, from Chemguard Specialty Chemicals and Equip., Mansfield, TX. Suitable foams can have an expansion ratio ranging, for example, from between about 2:1 to about 200:1, or greater.

Various configurations for dispenser 120 are further contemplated according to present aspects, with the understanding that present aspects contemplate a dispenser that comprises an inlet for a pressurized water flow where the water flow is directed from the inlet into and out of an associated reservoir for the purpose of mixing a pressurized water flow with contents contained within the reservoir (to form a water-based fire-retardant mixture in the reservoir), followed by the release of a pressurized flow of water-based fire retardant from the dispenser.

The disclosed dispensers presented herein can be dispensers that engage the water delivery station outlets in a mating arrangement including, for example, quick attachment and quick release arrangements, with fittings or connectors on the dispenser and on the water delivery station outlet that mate together and that engage and then disengage such that the dispenser is removable from the water delivery station outlet. Such dispensers can be stowed when not in use.

According to further aspects, dispensers can further incorporate a dispenser assembly that can also be engageable with and disengageable from the water delivery outlets, with at least a portion of the dispenser assembly remaining in a fixed position that can be located remotely from (e.g., a predetermined distance from) the water delivery station, but that can be placed in communication with the water delivery station on demand, or that can remain in communication with the water delivery station.

For example, one type of dispenser can be a sprinkler or a plurality of sprinklers, located in a fixed position, for example, in a cabin ceiling, cabin wall, storage bin, etc. In this configuration, the sprinkler can include a dispenser outlet in the form of, for example, a sprinkler "head" that can be in an exposed or partially exposed orientation in a fixed location. In this configuration, the dispenser can include, and/or be in communication with, water lines (e.g., dispenser "feed" lines) that extend from the water delivery station to the dispenser outlet (e.g., the sprinkler head). When the need to dispense a water-based fire retardant from the system is identified (e.g., identified automatically or through the manual engagement of a switch, etc.), the system can be activated to release a water-based fire-retardant (e.g., water alone, or a water-based fire-retardant mixture) from the water delivery station outlet, through the dispenser feed line, with the water-based fire retardant directed into and out of the dispenser outlet (e.g., the sprinkler head).

When the water delivery station is partially or completely contained within, or is otherwise integral with, for example, a modular galley service unit, if the galley service unit is removed from a designated location during servicing, re-filling, etc., the dispenser (e.g., sprinkler and dispenser feed line) can be temporarily separated from and disengaged from the water delivery station outlet. When the modular galley service unit is re-installed (e.g., during pre-flight), the dispenser can once again be placed in communication with the water delivery station outlet.

FIGS. 13, 14, and 15 are illustrations showing fixed dispensers, according to present aspects, in the form of sprinklers. As shown in FIG. 13, an aircraft coach cabin 1300 includes storage bins 1302 from which protrude dispensers 1304 in the form of sprinkler heads. The sprinkler heads, acting as dispensers are in communication with one or more water delivery stations which, in turn are in communication with a main water supply, or at least one auxiliary water supply of the type shown in one or more of FIGS. 1, 2, 3, 4, 5, 6, 7, 8, 9.

FIG. 14 is an illustration showing cabin wall-mounted dispensers according to present aspects. As shown in FIG. 14, aircraft cabin 1400 includes cabin wall 1402 from which protrude dispensers 1404 in the form of sprinkler heads. The sprinkler heads, acting as dispensers are in communication with one or more water delivery stations which, in turn are in communication with a main water supply, or at least one auxiliary water supply of the type shown in one or more of FIGS. 1, 2, 3, 4, 5, 6, 7, 8, 9.

FIG. 15 is an illustration showing cabin ceiling-mounted dispensers according to present aspects. As shown in FIG. 15 an aircraft first class cabin 1500 includes an aircraft cabin ceiling 1502 from which protrude dispensers 1506 in the form of sprinkler heads. The sprinkler heads, acting as dispensers are in communication with one or more water delivery stations which, in turn are in communication with a main water supply, or at least one auxiliary water supply of the type shown in one or more of FIGS. 1, 2, 3, 4, 5, 6, 7, 8, 9.

The sprinklers can comprise a sensor (not shown in FIG. 13, 14, or 15) or be in communication with a sensor that can transmit a signal and/or receive signals that can actuate the release of a water flow under pressure, with the water flow pressure preferably ranging from about 100 to about 150 psig. According to present aspects, the fire suppression system and the release of a water flow from the sprinkler heads can be activated manually (e.g., by an attendant, etc.) or automatically through the detection of heat or smoke, for example.

Though not shown in FIG. 13, 14, or 15, dispenser feed lines extend out of sight from a sprinkler head inlet to water delivery station outlets from water delivery stations that can be located in the vicinity of the sprinklers with which the water delivery stations are in communication, or the water delivery stations can be located at a predetermined distance from the sprinklers with which the water delivery stations are in communication (e.g., located a distance that is remote from and not in the vicinity of the connected water delivery stations).

As with the dispenser shown in FIG. 8A, when the dispensers are in a sprinkler configuration, the sprinkler heads (e.g., the dispenser "outlet") can further facilitate the release of a water-based retardant flow from the dispenser in a fashion equivalent to the function of the nozzle 128 shown in FIG. 8A. The dispensers shown in FIGS. 13, 14, and 15 can also be in communication with a water-based fire-retardant supply that can include materials such as, for example, flocculants, foaming agents, and other materials that, when water is added, form water-based fire retardant mixtures.

Various configurations for dispensers 1304, 1404, and 1506 are further contemplated according to present aspects, with the understanding that present aspects contemplate a dispenser in the form of a sprinkler system that comprises an inlet for a pressurized water flow, where the water flow is directed from a pressurized water source that can be pressurized within or outside of a water delivery station to a pressure that is significantly higher than the main water delivery system in the vehicle.

FIGS. 10, 11, 12 are flowcharts outlining methods according to present aspects. As outlined in FIG. 10 a method 1000 for installing a fire suppression system in a passenger vehicle is disclosed, with the method 1000 including installing 1002 a water delivery station into a vehicle and engaging 1004 the water delivery station in communication with at least one of a water supply first line and a water supply second line. According to present aspects, the water delivery station can be in communication with an existing vehicle water supply, with the water delivery station including a first water delivery outlet, and with the first water delivery outlet in communication with the water supply. The water delivery station further includes a second water delivery outlet, with the second water delivery outlet in communication with the pre-exiting vehicle water supply, wherein the second water delivery outlet is configured to mate with a dispenser, and wherein the first water delivery outlet is configured to deliver a first water flow from the water delivery station at a first water flow pressure, and the second water delivery outlet is configured to deliver a second water flow from the water delivery station at a second water flow pressure that is greater than the first water flow pressure.

As outlined in FIG. 11, a method 1100 is disclosed according to present aspects for suppressing a fire in a vehicle cabin with the method 1100 including directing 1102 water from a vehicle water supply to a water delivery station, with the water delivery station including a first water delivery outlet configured to deliver a first water flow from the first water delivery outlet at a first water pressure, and with the first water delivery outlet in communication with the vehicle water supply, and a second water delivery outlet configured to deliver a second water flow from the second water delivery outlet at a second water pressure, with the second water delivery outlet in communication with the vehicle water supply, and with the second water delivery outlet configured to mate with a dispenser. The method further includes connecting 1104 a dispenser to the second water delivery outlet, releasing 1106 the second water flow from the dispenser, and wherein the second water pressure is greater than the first water pressure.

As outlined in FIG. 12, a method 1200 is disclosed according to present aspects for suppressing a fire in a vehicle cabin with the method 1200 including the aspects of FIG. 11. In another aspect, as shown in FIG. 12, before the step of releasing 1106 the second water flow, the method 1200 further includes directing 1108 an amount of water from the vehicle water supply to the second water delivery outlet. The methods outlined in FIGS. 10, 11, and 12 can incorporate the systems and apparatuses disclosed in at least one or more of FIGS. 1, 2, 3, 4, 5, 6, 7, 8, 9.

FIG. 16 is a flowchart outlining a method according to present aspects with the method 1600 including installing 1601 a water delivery station in a vehicle and directing 1602 an auxiliary water supply to a water delivery station. The auxiliary water supply can be located within the water delivery station, proximate to the water delivery station, or can be in communication with the water delivery station. The auxiliary water supply can be located remotely from the water delivery station and in communication with the water delivery station. Method 1600 further includes engaging 1604 a dispenser (that can be a removable dispenser) with a water delivery station outlet and directing 1606 a water flow at high pressure from the water delivery station, with the "high" pressure being a pressure that is higher than and outside of the range of the typical pressure range for a typical pressurized water flow used in connection with the water delivery station (e.g., a typical "low" pressure ranging from about 10 to about 40 psig.). While being bound to no particular upper range, the "higher" pressure presently believed to be useful for fire suppression, is a "high" pressure ranging from about 100 to about 150 psig. In further aspects, the lower limit of this range could be lower, so long as the lower pressure limit of the higher pressure range is greater than about 40 psig. According to present aspects, the term "engaging" includes connecting (including releasably connecting) a dispenser to the water delivery station outlet.

The pressurization of the water flow in method 1600 can occur via pressure-increasing devices located integral with the water delivery station or can be pressure-increasing devices located remotely from, but in communication with, the auxiliary water supply. In addition, according to present aspects, the pressure-increasing devices can be devices included in the delivery systems for low pressure water flows, and that, in the case of pumps (e.g., compressors) can also operate at variable speeds or that can otherwise deliver, on demand, a higher pressure to the water lines responsible for directing a high pressure water flow from the high pressure water delivery station outlet (e.g., for fire suppression). As disclosed herein the pressure-increasing device can be a pump, a compressor, a container under pressure, and further can be an assembly or system for directing air pressure from an existing source of air pressure that can, for example, include bleed air, etc. The methods outlined in FIG. 16 can incorporate at least the apparatuses and systems set forth at least in FIGS. 8B, 8C, 8D.

FIG. 17 is a flowchart outlining a further method according to present aspects with method 1700 including directing 1702 a water flow from a water supply to a water delivery station, and connecting 1704 a dispenser to a high pressure water delivery outlet that can be a second water delivery outlet in a water delivery station also having a lower pressure first water delivery outlet. Method 1700 further shows directing 1706 a water flow from the second water delivery outlet to a dispenser that is attached to or otherwise engaged with the second water delivery outlet and releasing 1709 a water flow that can be a second water flow from the dispenser at high pressure, with "high" pressure ranging from about 100 to about 150 psig. In further aspects, the lower limit of this range could be lower, so long as the lower pressure limit of the higher pressure range is greater than about 40 psig. The methods outlined in FIG. 17 can incorporate the systems and apparatuses disclosed in at least one or more of FIGS. 1, 2, 3, 4, 5, 6, 7, 8, 9.

FIG. 18 is a flowchart outlining a further method according to present aspects. As shown in FIG. 18, method 1800 includes accessing 1802 a water delivery station, with the water delivery station in communication with an auxiliary water supply and with the water delivery station including a first water delivery outlet and a second water delivery outlet, and engaging 1804 a dispenser with the second water delivery outlet. Method 1800 further includes delivering 1806 a water flow from the second water delivery outlet at a second water flow pressure that can be a second water flow pressure ranging from about 100 to about 150 psig. According to present aspects, the term "engaging" includes connecting (including releasably connecting) a dispenser to the water delivery station outlet.

FIG. 19A is a flowchart outlining a further method according to present aspects. As shown in FIG. 19A, method 1900 includes accessing 1802 a water delivery station, with the water delivery station in communication with an auxiliary water supply and with the water delivery station including first and second water delivery outlets, and engaging 1804 a dispenser with the second water delivery outlet. Method 1800 further includes increasing 1805 a first water flow pressure (e.g., a water flow pressure ranging from about 10 to about 40 psig.) to a second water flow pressure (e.g. a water flow pressure ranging from about 100 to about 150 psig., etc.) and delivering 1806 a water flow from the second water delivery outlet at the second water flow pressure.

FIG. 19B is a flowchart outlining a further method according to present aspects. As shown in FIG. 19B, method 1950 includes accessing 1802 a water delivery station, with the water delivery station in communication with an auxiliary water supply and with the water delivery station including first and second water delivery outlets, and engaging 1804 a dispenser with the second water delivery outlet, and transmitting a signal from a sensor to a receiver with the receiver in communication with a pressure-increasing device. Method 1950 further includes increasing 1805 a first water flow pressure (e.g., a water flow pressure ranging from about 10 to about 40 psig.) to a second water flow pressure (e.g. a water flow pressure ranging from about 100 to about 150 psig., etc.) and delivering 1806 a water flow from the second water delivery outlet at a second water flow pressure. The methods outlined in FIGS. 18, 19A, and 19B can incorporate at least the apparatuses and systems set forth at least in FIGS. 8B, 8C, 8D.

FIG. 20 is a flowchart outlining a method for suppressing a fire in a vehicle cabin, and a method for dispersing a water-based fire retardant from a dispenser that is in communication with a water delivery station according to present aspects. As shown in FIG. 20, method 2000 includes directing 2002 a water flow from a water supply to a water delivery station, and connecting 2004 a dispenser to a high pressure water delivery outlet that can be a second water delivery outlet in a water delivery station that can also include a lower pressure first water delivery outlet. Method 2000 further includes directing 2006 water from a second water delivery outlet to a dispenser, and forming 2008 a water-based fire retardant (e.g., by contacting a foaming agent with the water flow to form a fire-retardant mixture that can be a fire-retardant foaming mixture, etc.), and releasing 2010 the water-based fire retardant from the dispenser at a high pressure. The "high" pressure being "higher" than the significantly lower water flow pressures otherwise routed through the water delivery station, for example, functions typically associated with lavatory and galley delivery functions on an aircraft. While being bound to no specific upper limit range, according to present aspects, the "higher" pressure believed to be useful for fire suppression is a "high" pressure ranging from about 100 to about 150 psig. In further aspects, the lower limit of this range could be lower, so long as the lower pressure limit of the higher pressure range is greater than about 40 psig.

FIG. 21 is a flowchart outlining a method for suppressing a fire in a vehicle cabin, and a method for dispersing a water-based fire retardant from a dispenser that is in communication with a water delivery station according to present aspects. As shown in FIG. 21, method 2100 includes directing 2002 a water flow from a water supply to a water delivery station, and connecting 2004 a dispenser to a high pressure water delivery outlet that can be a second water delivery outlet in a water delivery station also having a lower pressure first water delivery outlet. Method 2100 further includes transmitting 2012 a signal from a sensor to a receiver, with the receiver in communication with a pressure-increasing device, and increasing 2014 pressure in at least one of a water supply first line and a water supply second line. Method 2100 further includes directing 2006 water from the second water delivery outlet to the dispenser, and forming 2008 a water-based fire retardant (e.g., by contacting a foaming agent with the water flow to form a fire-retardant mixture that can be a fire-retardant foaming mixture, etc.), and releasing 2010 the water-based fire retardant from the dispenser at a high pressure. The "high" pressure being "higher" than the significantly lower water flow pressures otherwise routed through the water delivery station, for example, functions typically associated with lavatory and galley delivery functions on an aircraft. While being bound to no particular upper range, the "higher" pressure presently believed to be useful for fire suppression, is a "high" pressure ranging from about 100 to about 150 psig. In further aspects, the lower limit of this range could be lower, so long as the lower pressure limit of the higher pressure range is greater than about 40 psig. The methods outlined in FIGS. 20 and 21 can incorporate at least the apparatuses and systems set forth at least in FIGS. 8A, 8B, 8C, 8D.

The present invention may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. An aircraft passenger cabin fire extinguishing system for extinguishing an aircraft passenger cabin fire in an aircraft passenger cabin, said aircraft passenger cabin fire extinguishing system comprising:

- an aircraft water supply, said aircraft water supply in direct communication with a water supply first line extending from the aircraft water supply, said aircraft water supply contained within a water tank;
- an aircraft water delivery station monument, said aircraft water delivery station monument in direct communication with the water supply first line, said aircraft water delivery station monument comprising:
  - a first water delivery outlet, said first water delivery outlet configured to deliver a first water flow from the aircraft water delivery station monument, said first water flow configured to be delivered from said aircraft water delivery station monument at a first water flow pressure;

a second water delivery outlet, said second water delivery outlet configured to deliver a second water flow from the aircraft water delivery station monument, said second water flow configured to be delivered from said aircraft water delivery station monument at a second water flow pressure;

a dispenser, said dispenser configured to removably engage only with the second water delivery outlet, said dispenser further in communication with only the second water flow, said dispenser configured to deliver only the second water flow at the second water flow pressure from the second water delivery outlet;

wherein the second water flow pressure exceeds the first water flow pressure;

wherein said dispenser is further configured to direct only the second water flow only at the second water flow pressure from the second water delivery outlet of the aircraft water delivery station monument to a target zone in the aircraft passenger cabin for purposes of extinguishing the aircraft passenger cabin fire in the aircraft passenger cabin;

wherein the first water flow pressure ranges from about 10 to about 40 psig,; and wherein the second water flow pressure ranges from about 100 to about 150 psig.

2. The aircraft passenger cabin fire extinguishing system of claim 1, wherein at least one of the second water delivery outlet and the dispenser comprise a pressure-increasing device.

3. The aircraft passenger cabin fire extinguishing system of claim 1, wherein said second water delivery outlet is in communication with at least one pressure-increasing device, said at least one pressure-increasing device further in communication with the water supply first line.

4. The aircraft passenger cabin fire extinguishing system of claim 3, wherein the at least one pressure-increasing device comprises a venturi valve.

5. The aircraft passenger cabin fire extinguishing system of claim 3, wherein the at least one pressure-increasing device is in communication with an air source.

6. The aircraft passenger cabin fire extinguishing system of claim 1, wherein said system further comprises an additional and dedicated water supply line, said additional and dedicated water supply line in communication with the at least one water supply, said additional and dedicated water supply line further in communication with the second water delivery outlet.

7. The aircraft passenger cabin fire extinguishing system of claim 6, further comprising at least one pump in communication with the additional and dedicated water supply line.

8. The aircraft passenger cabin fire extinguishing system of claim 1, wherein the aircraft water supply is contained within an existing aircraft water tank.

9. An aircraft comprising:

an aircraft passenger cabin fire extinguishing system for delivering water, said aircraft passenger cabin fire extinguishing system comprising;

an aircraft water supply, said aircraft water supply in direct communication with a water supply first line extending from the aircraft water supply, said aircraft water supply contained within a water tank;

an aircraft water delivery station monument, said aircraft water delivery station monument in direct communication with the water supply first line, said aircraft water delivery station monument comprising:

a first water delivery outlet, said first water delivery outlet configured to deliver a first water flow from the aircraft water delivery station monument, said first water flow configured to be delivered from said aircraft water delivery station monument at a first water flow pressure;

a second water delivery outlet, said second water delivery outlet configured to deliver a second water flow from the aircraft water delivery station monument, said second water flow configured to be delivered from said aircraft water delivery station monument at a second water flow pressure;

a dispenser, said dispenser configured to removably engage only with the second water delivery outlet, said dispenser further in communication with only the second water flow, said dispenser configured to deliver only the second water flow at the second water flow pressure from the second water delivery outlet;

wherein the second water flow pressure exceeds the first water flow pressure;

wherein said dispenser is further configured to direct only the second water flow only at the second water flow pressure from the second water delivery outlet of the aircraft water delivery station monument to a target zone in the aircraft passenger cabin for purposes of extinguishing the aircraft passenger cabin fire in the aircraft passenger cabin;

wherein the first water flow pressure ranges from about 10 to about 40 psig,; and wherein the second water flow pressure ranges from about 100 to about 150 psig.

10. The aircraft of claim 9, wherein the aircraft water supply is a pre-existing onboard vehicle water supply.

11. The aircraft of claim 9, wherein the second water delivery outlet is in communication with a pressure-increasing device.

12. The aircraft of claim 11, wherein the pressure-increasing device comprises a pump.

13. The aircraft of claim 9, wherein the aircraft passenger cabin fire extinguishing system further comprises a water supply second line, said water supply second line in communication with the aircraft water supply, said water supply second line further in communication with the aircraft water delivery station, said water supply second line further in communication with the second water delivery outlet.

14. A method for installing a fire extinguishing system in a passenger aircraft, said method comprising:

installing a water delivery station monument into an aircraft to form an aircraft water delivery station monument, said aircraft water delivery station monument comprising a first water delivery outlet, and said water delivery station further comprising a second water delivery outlet;

engaging the aircraft water delivery station monument in communication with a water supply first line from an onboard water supply;

engaging a dispenser to removably mate with the second water delivery outlet;

wherein the first water delivery outlet is configured to deliver a first water flow from the aircraft water delivery station monument at a first water flow pressure;

wherein the second water delivery outlet is configured to deliver a second water flow from the aircraft water delivery station monument and into the dispenser at a second water flow pressure;

wherein said second water flow pressure is greater than the first water flow pressure;

wherein the first water flow pressure ranges from about 10 to about 40 psig,; and wherein the second water flow pressure ranges from about 100 to about 150 psig.

15. A method for extinguishing an aircraft passenger cabin fire in an aircraft passenger cabin of an aircraft, the method comprising:

directing water from an aircraft water supply to an aircraft water delivery station monument, said aircraft water delivery station monument comprising:

a first water delivery outlet configured to deliver a first water flow from the first water delivery outlet at a first water flow pressure;

a second water delivery outlet configured to deliver a second water flow from the second water delivery outlet at a second water flow pressure;

connecting a dispenser to the second water delivery outlet, said dispenser configured to removably mate with the second water delivery outlet;

releasing only the second water flow from the dispenser at the second water flow pressure to a target zone in the aircraft passenger cabin;

wherein the second water flow pressure is greater than the first water flow pressure;

wherein the first water flow pressure ranges from about 10 to about 40 psig,; and wherein the second water flow pressure ranges from about 100 to about 150 psig.

16. The method of claim 15, wherein the dispenser comprises a nozzle assembly, said nozzle assembly further comprising a hose.

* * * * *